(12) United States Patent
Aman et al.

(10) Patent No.: US 8,495,669 B2
(45) Date of Patent: Jul. 23, 2013

(54) DISK ROTATING DEVICE, DISK, DISK ASSEMBLY, DISK CARTRIDGE, AND RECORDING AND REPRODUCING DEVICE

(75) Inventors: Yasutomo Aman, Kanagawa (JP); Nobuaki Onagi, Kanagawa (JP); Shozo Murata, Kanagawa (JP); Yasunori Sugimoto, Kanagawa (JP); Haruki Tokumaru, Tokyo (JP); Daiichi Koide, Tokyo (JP); Yoshimichi Takano, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 508 days.

(21) Appl. No.: 12/594,912

(22) PCT Filed: Mar. 12, 2009

(86) PCT No.: PCT/JP2009/055385
§ 371 (c)(1),
(2), (4) Date: Oct. 6, 2009

(87) PCT Pub. No.: WO2009/113731
PCT Pub. Date: Sep. 17, 2009

(65) Prior Publication Data
US 2010/0058373 A1   Mar. 4, 2010

(30) Foreign Application Priority Data

Mar. 13, 2008   (JP) ................................. 2008-064752
Mar. 14, 2008   (JP) ................................. 2008-066750

(51) Int. Cl.
*G11B 7/24*   (2006.01)
*G11B 17/03*   (2006.01)

(52) U.S. Cl.
USPC ........................... 720/722; 720/655; 720/717

(58) Field of Classification Search
USPC ................ 720/645, 648, 649, 651, 652, 654, 720/655, 732–734, 737, 715–717, 718–724
See application file for complete search history.

(56) References Cited

U.S. PATENT DOCUMENTS

| | | | |
|---|---|---|---|
| 5,590,114 A * | 12/1996 | Murphy | 720/719 |
| 5,621,597 A | 4/1997 | Ikebe et al. | |
| 5,663,851 A * | 9/1997 | Jeong et al. | 360/98.08 |
| 6,226,254 B1 * | 5/2001 | Komatsu et al. | 720/717 |
| 7,164,629 B2 | 1/2007 | Aman et al. | |
| 7,194,750 B2 | 3/2007 | Aman et al. | |
| 7,233,554 B2 | 6/2007 | Onagi et al. | |
| 7,367,036 B2 | 4/2008 | Aman et al. | |
| 7,407,698 B2 | 8/2008 | Murata et al. | |
| 7,428,199 B2 | 9/2008 | Aman et al. | |
| 2003/0058772 A1 * | 3/2003 | Takagi et al. | 369/75.1 |
| 2003/0210497 A1 * | 11/2003 | Aoishi et al. | 360/133 |
| 2004/0196777 A1 * | 10/2004 | Komaki et al. | 369/283 |
| 2006/0184957 A1 * | 8/2006 | Koshino | 720/706 |
| 2007/0050786 A1 * | 3/2007 | Ryu | 720/604 |

(Continued)

FOREIGN PATENT DOCUMENTS

| | | |
|---|---|---|
| JP | 58-169381 | 10/1983 |
| JP | 59-125792 U | 8/1984 |

(Continued)

*Primary Examiner* — Nathan Danielsen
(74) *Attorney, Agent, or Firm* — Dickstein Shapiro LLP

(57) ABSTRACT

A disk rotating device includes a flexible disk in which information is recordable, a turntable on which the disk is held, a spindle that rotates the disk held on the turntable, and a stabilizer that stabilizes the rotating disk. In the disk rotating device, a rotation transmitting device transmits the rotation of the spindle to the disk via the turntable, and a disk holding device holds the disk so that the disk is elastically deformable from a center of the rotation of the disk in a radial direction of the disk.

4 Claims, 25 Drawing Sheets

U.S. PATENT DOCUMENTS

| | | |
|---|---|---|
| 2007/0058500 A1 | 3/2007 | Onagi et al. |
| 2007/0061828 A1 | 3/2007 | Aman et al. |
| 2007/0107004 A1 | 5/2007 | Aman et al. |
| 2007/0248000 A1 | 10/2007 | Murata et al. |
| 2007/0286045 A1 | 12/2007 | Onagi et al. |
| 2009/0010123 A1 | 1/2009 | Koide et al. |

FOREIGN PATENT DOCUMENTS

| | | |
|---|---|---|
| JP | 61-98279 U | 6/1986 |
| JP | 62-80264 U | 5/1987 |
| JP | 02-281463 | 11/1990 |
| JP | 04-344362 | 11/1992 |
| JP | 5-54502 A | 3/1993 |
| JP | 6-28752 A | 2/1994 |
| JP | 2882379 B2 | 2/1999 |
| JP | 11-328794 | 11/1999 |
| JP | 2006-107699 A | 4/2006 |
| JP | 2006-344291 A | 12/2006 |
| JP | 2007-149311 A | 6/2007 |
| JP | 2008-10050 | 1/2008 |

* cited by examiner

DISK ROTATING DEVICE, DISK, DISK ASSEMBLY, DISK CARTRIDGE, AND RECORDING AND REPRODUCING DEVICE

TECHNICAL FIELD

This invention relates to a disk rotating device, a disk, a disk assembly, a disk cartridge, and a recording and reproducing device.

BACKGROUND ART

In recent years, with a start of the digitization of television broadcasting, an information recording medium that is able to store or record mass digital data is demanded. For example, one of the basic methods to promote high density recording and reproducing in the field of optical disks is to make as small as possible the diameter of a spot of a light focused by the optical disk for recording and reproducing information.

In the following, an optical disk will be described as being a typical example, but the disk for use in the recording and reproducing device according to the invention is not limited to an optical disk. Any of disk-shaped recording media, such as a phase change memory, a magneto-optic memory, and a hologram memory, is applicable.

When a laser beam is focused to perform a high-density recording or reproducing on an optical disk, it is important to make axial runout of the disk surface at the time of the disk rotation, i.e., surface vibration, as small as possible.

Improvement in the speed of the data transfer rate is demanded with increasing amount of information to be recorded in an optical disk. For example, a target data transfer rate for the recording of HDTV image for broadcasting is 250 Mbps or more. When this data transfer rate is used for the recording on the whole recording surface of an optical disk, the rotation of the disk at a high speed above 15000 rpm is needed in order to secure the data transfer rate in the inside peripheral portion of the disk.

Even in the case of such a high speed rotation, it is necessary to make small the surface vibration of the disk with the successive high-speed rotation in order to ensure the stability of the focus servo to the disk at the time of recording and reproducing.

Conventionally, a method of holding a disk of a rigid body on a turntable with elastic bodies is known as a countermeasure for preventing the surface vibration due to vibrations of the disk. For example, each of Japanese Laid-Open Patent Application No. 6-28752, Japanese Patent No. 2882379 and Japanese Laid-Open Patent Application No. 5-54502 discloses a device for preventing vibrations of a disk.

In these vibration preventing devices according to the related art, the hard disk that is usually made of a rigid material is fixed to a turntable (spindle) via an elastic material. Using the elastic material, the vibration (resonance) of the hard disk when it is rotated is prevented, and the possible vibration caused by the poor connection of the disk holding part by the inclusion of dirt therein is prevented.

However, the vibration preventing devices according to the related art are unsuitable for recording and reproducing of the hard disk made of a rigid material when it is rotated at a high speed over 10000 rpm.

A flexible disk that is suitable for the high speed rotation is known. And a method using an aerodynamic stabilization unit when a flexible disk is rotated at a high speed is known. This method is proposed as a surface deflection preventing measure for high speed rotation of a flexible disk.

When the flexible disk is rotated at a high speed, surface vibration like a waving phenomenon are easily developed with the high-speed rotation of the flexible disk, where the phenomenon is different from the surface vibration due to the resonance as in the disk of a rigid material.

To prevent such surface vibration of a flexible disk, the method using the aerodynamic stabilization unit is usable. For example, each of Japanese Laid-Open Patent Application No. 2006-107699, Japanese Laid-Open Patent Application No. 2007-149311 and Japanese Laid-Open Patent Application No. 2006-344291 discloses a stabilizer member (or stabilizer). In the recording and reproducing device disclosed in these publications, the configuration of the stabilizer arranged on the surface of a flexible disk is modified. Thereby, the rotating disk is stabilized using the aerodynamic action between the disk and the stabilizer with the modified configuration, and recording and reproducing of information to the stabilized disk becomes possible.

Specifically, in the recording and reproducing device disclosed in Japanese Laid-Open Patent Application No. 2006-107699 or No. 2007-149311, a plane-surface stabilizer is arranged to face a flexible disk, or a curved concave surface stabilizer is arranged to face a flexible disk. A gap between the stabilizer and the disk surface is set to 0.05-0.30 mm, and the surface vibration of the disk when the disk is rotated at a high speed over 10000 rpm can be suppressed.

In the recording and reproducing device disclosed in Japanese Laid-Open Patent Application No. 2006-344291, a spacer with an arbitrary thickness is disposed between a flexible disk and a stabilizer plate, and the vibration of the disk is suppressed by using the flow of the incoming air from an air introducing hole in the inside peripheral portion of the spacer.

When these methods according to the related art are used, the vibration of the flexible disk is prevented by the stabilizer. In the cases of the existing recording media made of a rigid body, such as CD, DVD, BD, and HD-DVD, it is difficult to use the rotational speed over 10000 rpm. However, when these methods according to the related art are used, there is the possibility that enables stable driving at the rotational speed over 10000 rpm. Specifically, Japanese Laid-Open Patent Application No. 2006-107699 or No. 2007-149311 describes that a possible highest rotational speed of over 12000 rpm is usable for the rotation of a flexible disk.

For the time being, there is no actual recording and reproducing system which is capable of rotating a flexible disk at a high speed over 10000 rpm to perform recording and reproducing, and the practical solution is not yet known. Taking into consideration a disk rotating device according to the related art as shown in FIG. 18, the feasibility of a flexible disk 1 when it is rotated by the disk rotating device at a high speed over 10000 rpm has been tested.

As shown in FIG. 18, the flexible disk 1 is disposed between a damper 6 and a turntable 5 connected to a spindle 3, and the disk 1 is fixed there. When the disk 1 in this condition is rotated at a high speed over 10000 rpm, the problem that the disk 1 held on the turntable 5 is added a distortion in the vicinity of the inside peripheral portion. This distortion is accumulated and increased by the repetition of increasing and decreasing of the disk rotational speed and/or by the repetition of approaching or separating of the stabilizer 30 (in which the stabilizer 30 is moved in one of the approaching and separating directions according to the changes of the disk rotational speed).

The accumulated distortion may cause contacting or sliding of the disk 1 and the stabilizer 30 in the region of low rotational speeds. If the contacting or sliding of the disk 1 and the stabilizer 30 takes place, large surface vibration of the disk will be developed and the quality of the recording and reproducing signal from the recording head will be significantly degraded. If the operation of starting and stopping the rotation is repeated further, the disk 1 contacts the stabilizer 30, which may cause a fatal error and the rotation of the disk 1 may be stopped.

The arrangement of elastic bodies between the turntable and the disk, as disclosed in Japanese Laid-Open Patent Application No. 6-28752 or Japanese Patent No. 2882379, is tested for determining whether the arrangement prevents the problem or not. However, even if only one surface of the disk is fixed with the elastic material as disclosed in Japanese Laid-Open Patent Application No. 6-28752 or Japanese Patent No. 2882379, it is difficult to reduce efficiently the distortion of the disk in the drive operation including high speed rotation over 10000 rpm.

Even if both surfaces of the disk are fixed with elastic bodies as disclosed in Japanese Laid-Open Patent Application No. 5-54502, the contact surface of the elastic body and the disk is formed into a thin-line circular ring. A small amount of shifting the contact positions of the disk and the elastic body on the front and back surfaces will enlarge the distortion of the disk remarkably.

Thus, even if the composition for preventing the resonance of the rotating hard disk of a rigid material is applied to the disk rotating device for rotating the flexible disk, it is impossible to prevent the distortion of the inside peripheral portion of the flexible disk caused by the repetition of increasing and decreasing of the disk rotational speed and/or by the repetition of approaching or separating of the stabilizer 30.

DISCLOSURE OF INVENTION

In one aspect of the invention, the present disclosure provides a disk rotating device which is able to rotate a flexible disk at a high speed over 10000 rpm without accumulating the distortion in the inside peripheral portion of the disk and does not develop surface vibration of the disk over an extended period of time.

In an embodiment of the invention which solves or reduces one or more of the above-mentioned problems, the present disclosure provides a disk rotating device comprising: a flexible disk in which information is recordable; a turntable on which the disk is held; a spindle that rotates the disk held on the turntable; a stabilizer that stabilizes the rotating disk; a rotation transmitting device that transmits the rotation of the spindle to the disk via the turntable; and a disk holding device that holds the disk so that the disk is elastically deformable from a center of the rotation of the disk in a radial direction of the disk.

Other objects, features and advantages of the present invention will become more apparent from the following detailed description when read in conjunction with the accompanying drawings.

MODE(S) FOR CARRYING OUT THE INVENTION

A description will be given of embodiments of the invention with reference to the accompanying drawings.

Figure 1:
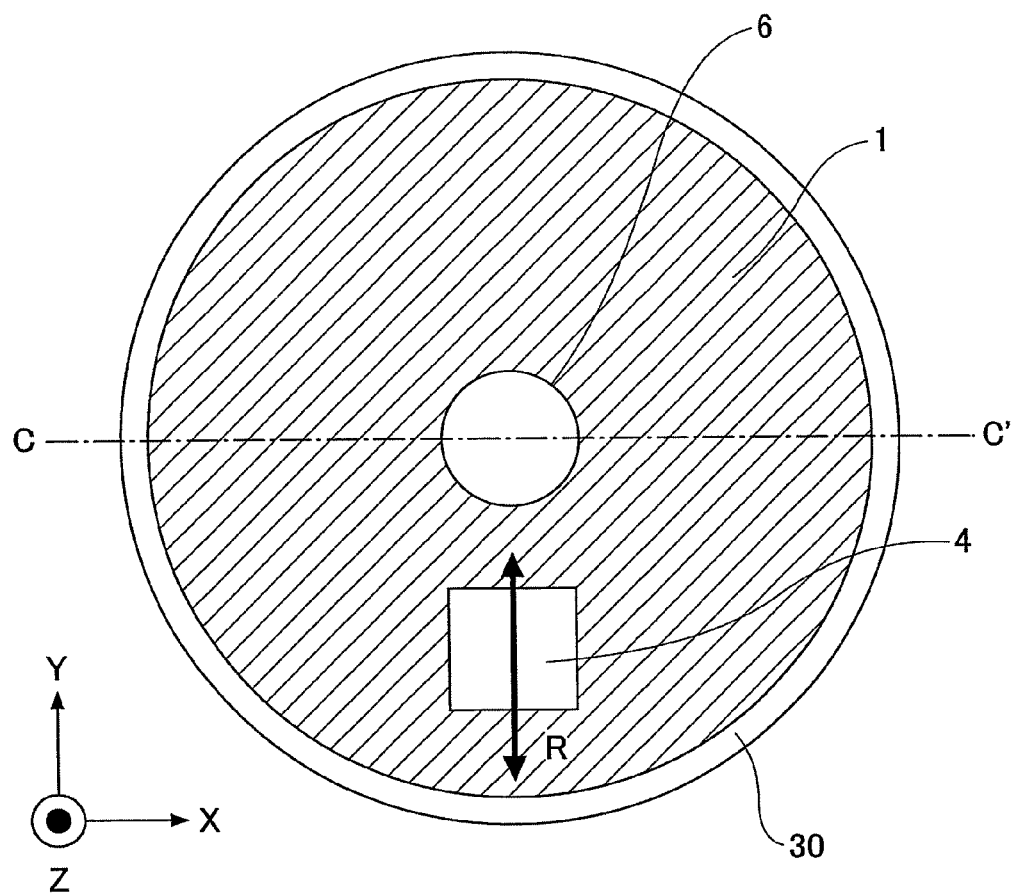
FIG. 1 is a plan view of a disk rotating device of an embodiment of the invention.
Figure 2:
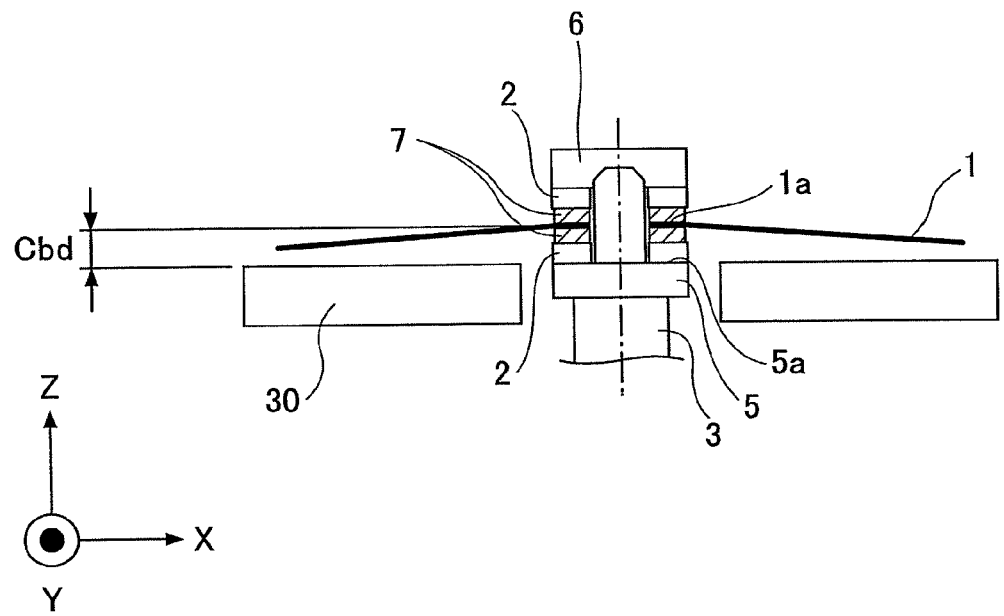
FIG. 2 is a cross-sectional view of the disk rotating device taken along the line C-C' indicated in FIG. 1.

FIG. 1 is a plan view of a disk rotating device of an embodiment of the invention. FIG. 2 is a cross-sectional view of the disk rotating device taken along the line C-C' indicated in FIG. 1.

In FIG. 1 and FIG. 2, reference numeral 1 denotes a disk which is a flexible recording medium. In this embodiment, an optical disk will be described as a typical example of the disk. However, the disk of the invention is not limited to an optical disk but is applicable to any of disk-shaped recording media, including a phase change memory, a magneto-optic memory, and a hologram memory. Reference numeral 1a denotes a holding part of the disk 1 at which the disk 1 is held on the turntable (which will be described below). Reference numeral 2 denotes a hub and reference numeral 3 denotes a spindle (which may include a spindle motor).

Reference numeral 4 denotes an optical pickup which is a recording/reproducing head which is moved relative to the disk 1 in the radial direction of the disk 1 along the line R and emits a light beam focused on the disk 1 to perform a light scanning and perform recording and reproducing of information.

Reference numeral 5 denotes a turntable which holds the disk 1 fixed to the rotating shaft of the spindle 3 and transmits the rotation of the spindle 3 to the disk 1, reference numeral 5a denotes a disk holding part of the turntable 5, and reference numeral 6 denotes a damper (disk fixing cap) for holding the disk 1 on the turntable 5.

Reference numeral 7 denotes an annular elastic body of a rubber-like material used to specify the thickness. The annular elastic bodies 7 are disposed on both the front and back sides of the holding part 1a of the disk 1. In the disk rotating device of this embodiment, the turntable 5, the elastic bodies 7, and the damper 6 constitute both a rotation transmitting device and a disk holding device.

Figure 3:
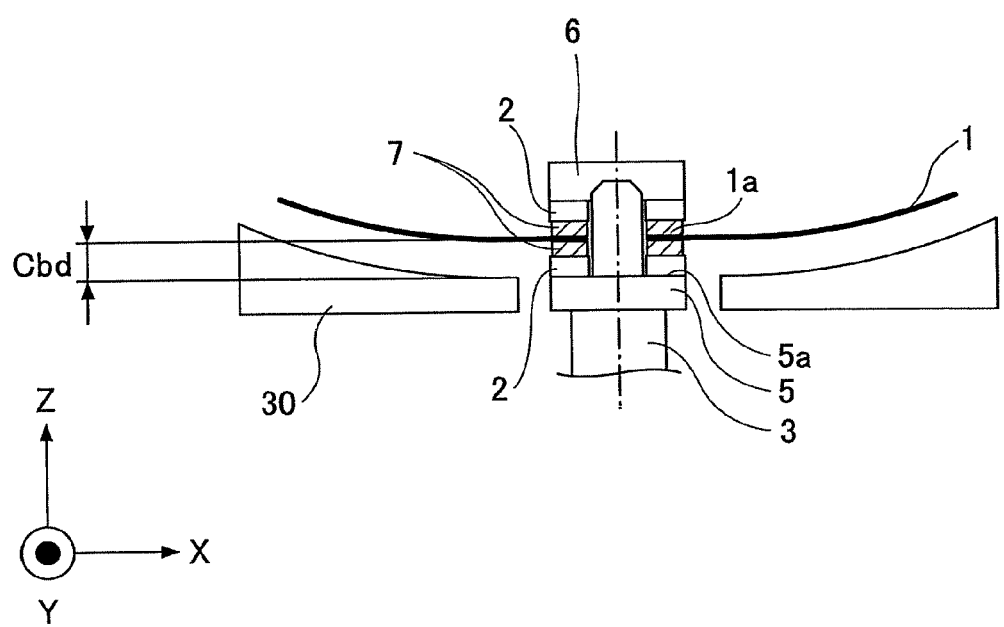
FIG. 3 is a cross-sectional view of a disk rotating device of an embodiment of the invention taken along the line C-C' indicated in FIG. 1.

FIG. 3 is a cross-sectional view of a disk rotating device of an embodiment of the invention taken along the line C-C' indicated in FIG. 1. In this embodiment, the configuration of a stabilizer 30 is arranged so that the surface of the stabilizer 30, facing the disk 1, is formed into a cylindrical concave surface as shown in FIG. 3, which is curved only in the C-C' direction (the transverse direction in FIG. 3), or formed into a cylindrical convex surface.

Alternatively, the surface of the stabilizer 30 facing the disk 1 may be formed into any of various configurations, such as a conical concave surface and a conical convex surface.

Figure 4:
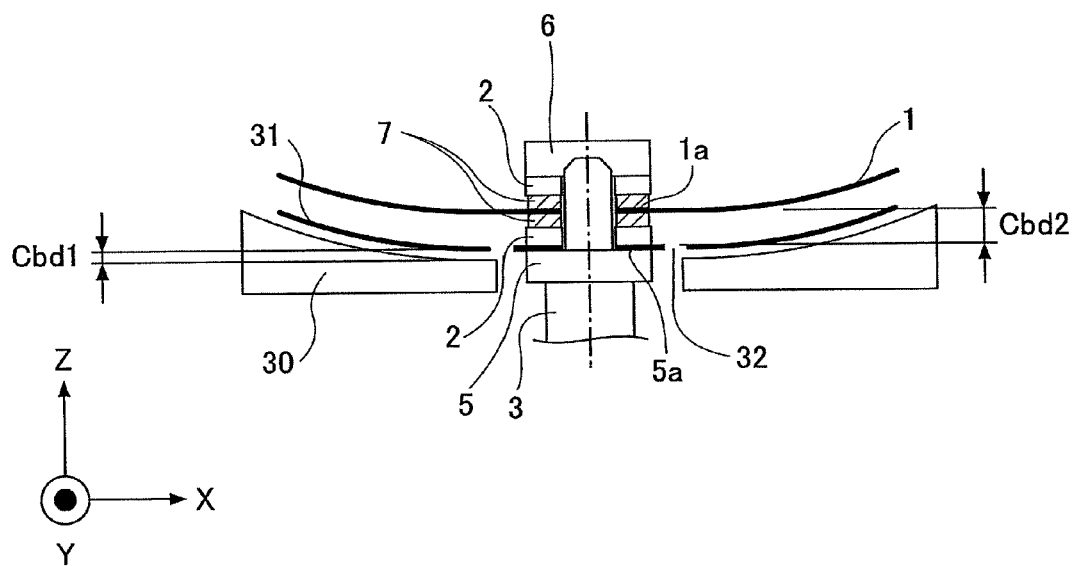
FIG. 4 is a cross-sectional view of a disk rotating device of an embodiment of the invention taken along the line C-C' indicated in FIG. 1.

FIG. 4 is a cross-sectional view of a disk rotating device of an embodiment of the invention taken along the line C-C' indicated in FIG. 1. In this embodiment, a flexible stabilizer 31 and a flexible disk 1 are connected as shown in FIG. 4. The flexible stabilizer 31 and the disk 1 are rotated together, and the use of the stabilizer 30 enables the rotation of the disk 1 at a high speed over 10000 rpm to be stabilized.

In this embodiment, the flexible stabilizer 31 is formed with two or more openings 32 on the circumference of the inside peripheral portion of the flexible stabilizer 31. The flexible stabilizer 31 is connected with the disk 1, and the air flows from the opening 32 when the disk 1 and the flexible stabilizer 31 are rotated together. The air flow raises the stabilizing effect.

Figure 5:
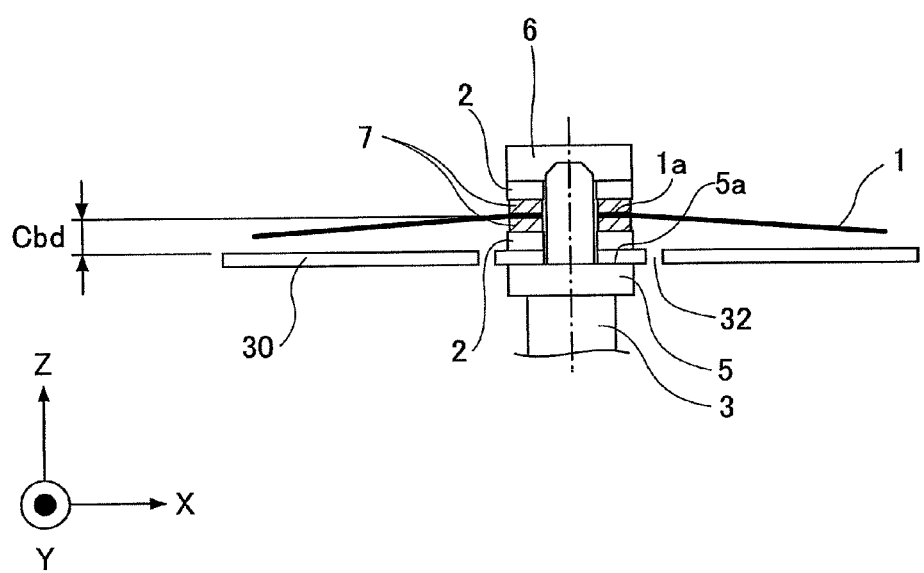
FIG. 5 is a cross-sectional view of a disk rotating device of an embodiment of the invention taken along the line C-C' indicated in FIG. 1.

FIG. 5 is a cross-sectional view of a disk rotating device of an embodiment of the invention taken along the line C-C' indicated in FIG. 1. In this embodiment, the stabilizer 30 is formed of a disk-like rigid body, and the stabilizer 30 and the disk 1 are rotated together as shown in FIG. 5.

In this embodiment, the stabilizer 30 is formed with two or more openings 32 on the circumference of the inside peripheral portion of the stabilizer 30. The air which flows from the opening 32 when the disk 1 and the stabilizer 30 are rotated together makes the stabilization of the high speed rotation of the disk 1 effective. The stabilizer according to the invention is not limited to this embodiment.

The operation of the disk rotating device of the embodiment of FIG. 1 and FIG. 2 which stabilizes the rotation of the disk 1 will be described.

As shown in FIG. 2, the disk 1 is held between the turntable 5 and the clamper 6 via the elastic bodies 7 so that the inside peripheral part of the disk 1 is held. The disk 1 is rotated by the rotating force of the spindle 3 which is connected coaxially with the turntable 5. During the rotation of the disk 1, the surface of the disk 1 facing the stabilizer 30 is maintained almost horizontally, and the rotating disk 1 is stabilized with small surface vibration by the aerodynamic effect of the stabilizer 30.

For example, in the embodiment of FIG. 2, the condition for obtaining a predetermined stabilized state is that the parameter value Cbd of a gap in the disk axial direction between the back surface of the holding part 1a (which is the central part of the disk 1) and the surface of the stabilizer 30 near the central part is set to be in a range of 0.1-0.2 mm. The setting conditions of the parameter value Cbd may vary depending on the configuration of the disk 1. The present invention is not limited to this embodiment.

The disk rotating device must have a rotation transmitting device that ensures transmission of the rotation of the spindle 3 to the disk 1 (the disk 1 and the turntable 5 are connected together suitably by the elastic bodies). An example of the disk holding device that enables the elastic deformation of the holding part 1a of the disk 1 is shown in FIG. 1-5. In the composition of FIG. 1-5, the disk 1 is elastically held with the elastic bodies on the front and back surfaces of the disk 1.

The elastic bodies 7 in the composition of FIG. 1-5 work to absorb the elastic deformation of the disk 1 by the action mentioned below. When the disk 1 is rotating, the centrifugal force is generated and expands the disk 1 itself in the radial direction. The expansion causes relative displacement of the disk 1 and the turntable 5 in the radial direction. The displacement of the disk 1 is absorbed effectively by the elasticity of the elastic bodies 7. When the centrifugal force disappears after stopping the rotation, the structural position between the disk 1 and the turntable 5 reversibly returns to the original state by the elasticity of the elastic bodies 7. That is, the elastic bodies 7 permit expansion and contraction of the disk 1 in the radial direction even at high rotational speed in which large deformation of the disk 1 may be generated by the centrifugal force. Examples of the elastic material which forms the elastic bodies 7 include rubbers, such as silicone rubber, fluororubber (i.e., Teflon (registered trademark) rubber), chloroprene rubber, urethane rubber, EPDM (ethylene-propylene-diene copolymer), etc., and a cured adhesive using a denatured silicone polymer as a base material. A modulus of shearing elasticity of the elastic material suitable for the elastic bodies 7 is about 10-100 MPa.

In the composition in which the elastic material is actually used as the elastic bodies 7, it is necessary to secure elastic deformation of the disk by the shearing stress, and an appropriate thickness of the elastic bodies 7 is needed. It is desirable that the thickness of the elastic body 7 is in a range of 5-300 micrometers. It is more desirable that the thickness of the elastic body 7 is in a range of 10-100 micrometers. For example, during the rotation of the disk 1 at a high speed over 20000 rpm, the elastic deformation of the peripheral edge (equivalent to the diameter of the perimeter of holding part 1a) of the holding part 1a of the disk 1 at the inside peripheral part thereof is set to about 20 micrometers (in a case of PC being used as the base material). Thus, it is preferred that the thickness of the elastic body is twice as large as the amount of the elastic deformation (i.e., about 40 micrometers).

Since the thickness of the elastic body influences the parameter value Cbd of the disk and the stabilizer 30 shown in FIG. 2, it is important to manage the thickness parameter accurately. Furthermore, it is preferred that the thicknesses of the rubber-like elastic bodies arranged on the front and back surfaces of the disk are the same.

With reference to FIG. 1 and FIG. 2, a typical example of the rotating operation of the disk rotation device when recording or reproducing of the disk is performed by the recording and reproducing device including the disk rotating device will be described as follows.

(1) The parameter value Cbd of the disk 1 and the stabilizer 30 is set to an auxiliary parameter value (for example, 2 mm) and the rotational speed of the disk 1 is increased to a preliminary rotational speed (for example, 4000 rpm).
(2) When the rotational speed of the disk 1 reaches the preliminary rotational speed, the parameter value Cbd is adjusted to a predetermined value (for example, 0.1 mm).
(3) The rotational speed of the disk 1 is increased to a predetermined rotational speed (for example, 15000 rpm).
(4) The recording or reproducing of the disk 1 is performed by the pickup head which is not illustrated.
(5) When the recording or reproducing is completed, the rotational speed of the disk 1 is reduced to the auxiliary rotational speed (for example, 4000 rpm).
(6) The stabilizer 30 is kept away from the disk 1 and the position of the stabilizer 30 set to the auxiliary parameter value (for example, 2 mm).
(7) The spindle 3 is stopped.

The disk rotating device of this embodiment shown in FIG. 1 and FIG. 2 holds the disk 1 on both sides of the holding part 1a of the disk 1 (at the inside peripheral part of the disk) by the turntable 5 and the clamp 6 via the elastic bodies 7. For this reason, when the disk 1 is rotated at a high speed, the stress due to the centrifugal force is exerted on the holding part 1a of the disk 1. Moreover, the stress due to the torsion force is also exerted near the outside peripheral part of the holding part 1a of the disk 1, depending on the change of the rotational speed of the disk 1. However, both sides of the disk 1 are held with the elastic bodies 7, and the stresses due to the centrifugal force and the torsion are distributed to the whole area including the elastic bodies 7 and the holding part 1a. By the stress distribution, distortion does not easily arise near the outside peripheral part of the holding part 1a of the disk 1, and the operations of rotating the disk 1 at high speed and stopping the rotation of the disk 1 can be repeated stably by the disk rotating device of this embodiment.

Figure 18:
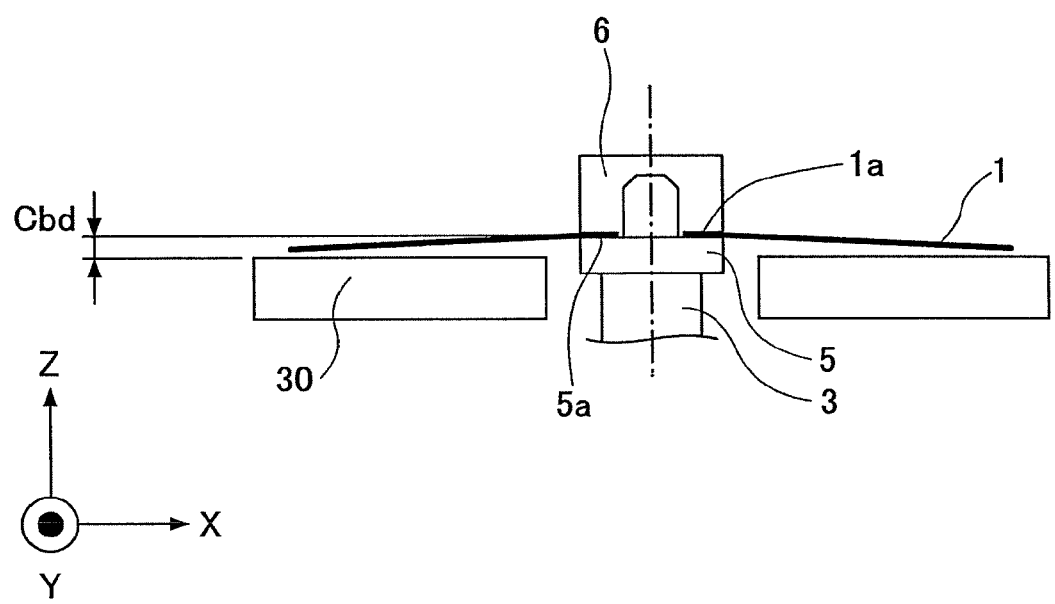
FIG. 18 is a cross-sectional view of a disk rotating device according to the related art.

On the other hand, the disk rotating device according to the related art is shown in FIG. 18. In this disk rotating device, the holding part 1a of the disk 1 is pinched by the turntable 5 of a rigid body and the clamp 6 so that the disk 1 is fixed. When the operations of rotating the disk 1 at high speed and stopping the rotation of the disk 1 are repeated similar to the disk rotating device of the embodiment of FIG. 1 and FIG. 2, the stresses are concentrated on the outside peripheral part of the holding part la of the disk 1, and only the outside peripheral part of the holding part 1a reacts to the stresses due to the centrifugal force and the torsion force. For this reason, distortion easily arises near the outside peripheral part of the holding part 1a of the disk 1 due to the stresses by the centrifugal force or the torsion force. The disk 1 easily shows unusual surface vibration with the high-speed rotation.

Figure 19:
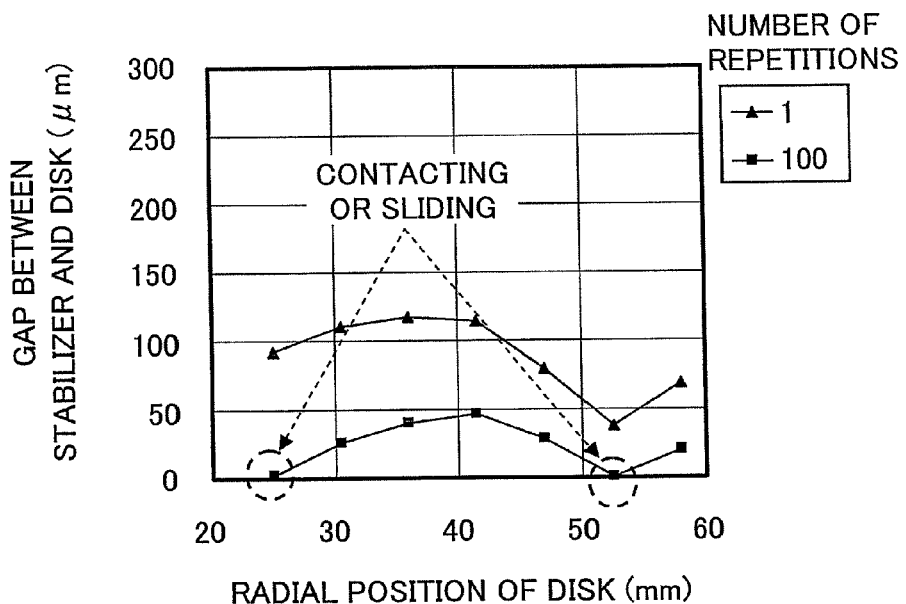
FIG. 19 is a diagram showing the relation of a disk radial direction position and a gap between the stabilizer and the disk when a repeatability test of the disk rotating device of FIG. 18 is carried out.
Figure 20:
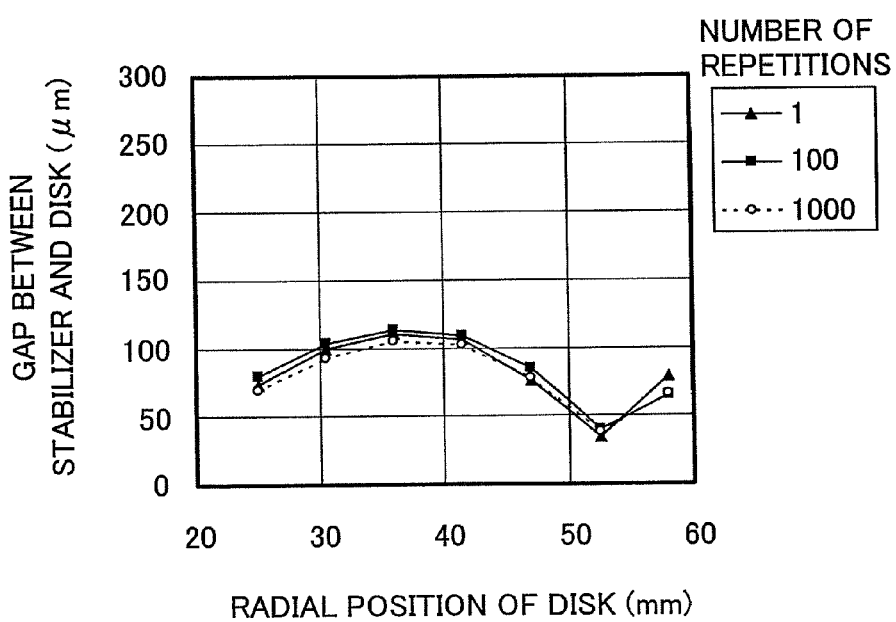
FIG. 20 is a diagram showing the relation of a disk radial direction position and a gap between the stabilizer and the disk when a repeatability test of the disk rotating device of FIG. 10 is carried out.

The experimental results of the related art of FIG. 18 and the embodiment of FIG. 2 in which the above-mentioned phenomenon has been confirmed are illustrated in FIG. 19 and FIG. 20, respectively.

FIG. 19 shows the relation of the disk radial direction position and the gap between the disk and the stabilizer at the rotational speed of 4000 rpm when a repeatability test of the disk rotating device of FIG. 18 is carried out. As shown in FIG. 19, when the number of repetitions is 1, the gap for all the disk radial direction positions of 25-58 mm is set to a value in a range of 40-120 micrometers which value is near the parameter value Cbd of the holding part 1a of the disk 1 (=0.1 mm). The parameter value Cbd is set up in the disk radial direction position of 15 mm, which is equivalent to the position of the holding part 1a of the disk 1 on the turntable 5.

When the number of repetitions exceeds 100, the gap at the disk radial direction position of 25 mm is set to 0 micrometer (although the parameter value Cbd of the holding part 1a of the disk 1 is 0.1 mm), and the disk 1 and the stabilizer 30 have contacted each other as shown in FIG. 19.

On the other hand, FIG. 20 shows the experimental result of the repeatability test of the disk by the disk rotating device of the embodiment of FIG. 2. As shown in FIG. 20, when the number of repetitions exceeds 100 (also when the number of repetitions exceeds 1000), the value of the gap for all the disk radial direction positions is in a range of 40-120 micrometers, which value is nearly equal to the value of the gap when the number of repetitions is 1.

The experimental result of the disk by the disk rotating device according to the related art shows that the disk configuration between the disk radial positions of 15 mm and 25 mm (around the peripheral part of the holding part 1a of the flexible disk on the turntable 5) significantly changes through the repetition of high speed rotation and stop.

In contrast, the experimental result of the disk by the disk rotating device of this embodiment shows that, even when the same operation is repeated (or the repetition of high speed rotation and stop), the disk configuration hardly changes. Although not illustrated in the drawings, the elastic member is arranged on one side of the disk 1, the disk 1 is held between the turntable 5 and the clamp 6 which are rigid bodies, and the same experiment has been performed. The experimental result in this case clearly shows a reduction of about 10% in the gap after the repetition of high speed rotation and stop.

The disk rotating devices of embodiments of the invention other than the embodiment of FIG. 2 will be described. FIG. 3, FIG. 4 and FIG. 5 are sectional views respectively showing the disk rotating devices of these embodiments taken along the line C-C' indicated in FIG. 1.

Figure 6A:
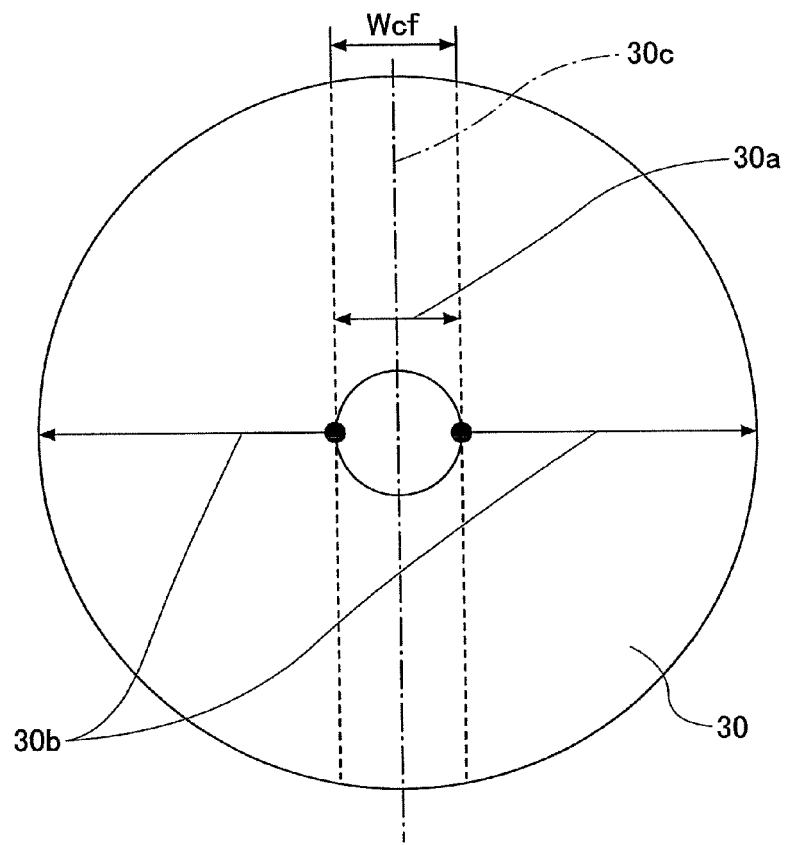
FIG. 6A and FIG. 6B are a plan view and a front view of a disk rotating device of an embodiment of the invention.
Figure 6B:
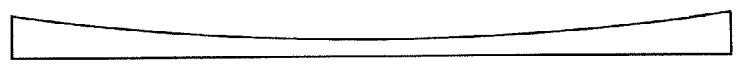
Figure 7:
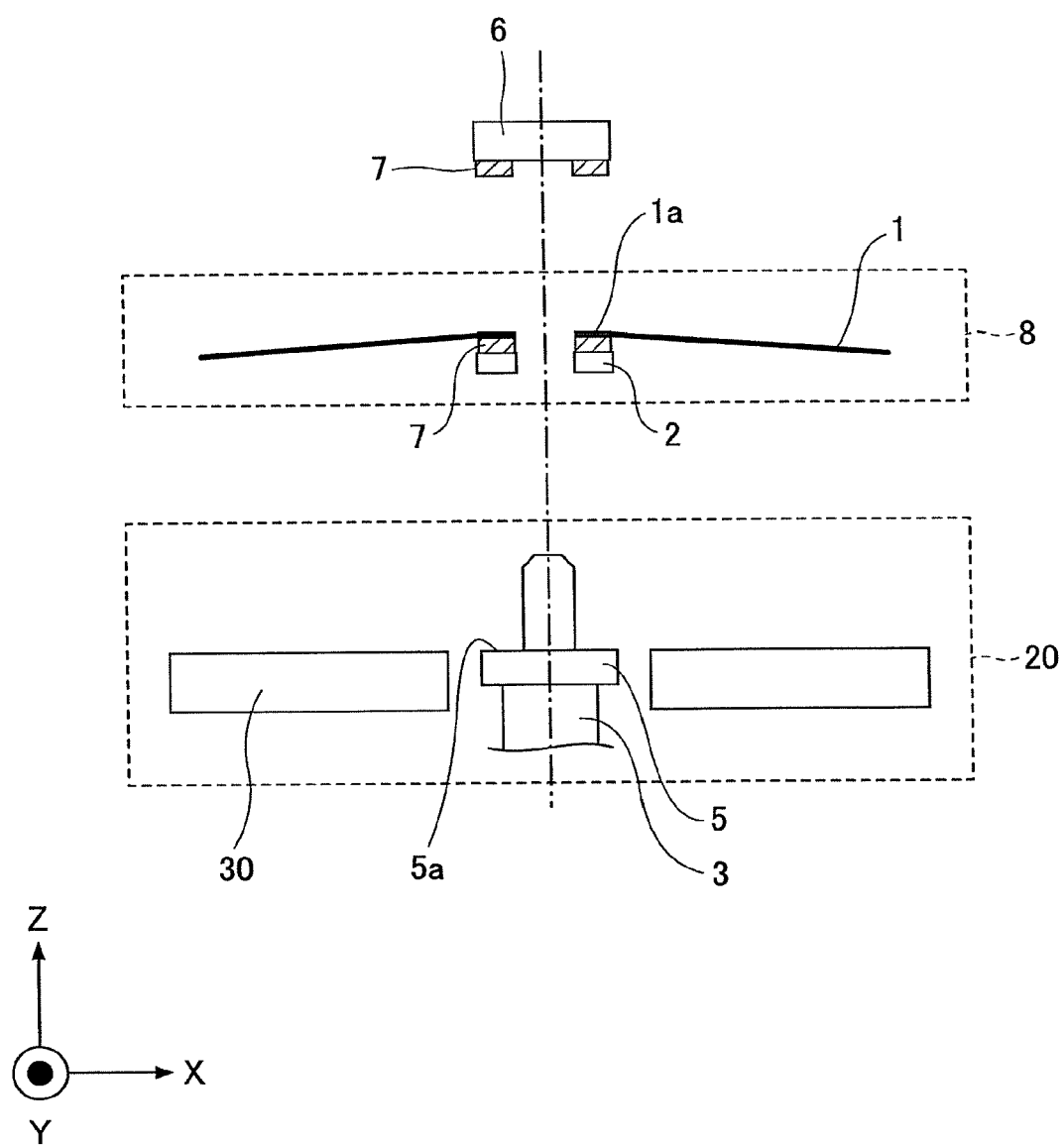
FIG. 7 is an exploded cross-sectional view of an example of the disk rotating device taken along the line C-C' indicated in FIG. 1.

As shown in FIG. 6B, the cylindrical curved surface of the stabilizer 30 of the disk rotating device shown in FIG. 3 has a flat part 30a with a width Wcf in its central portion, and cylindrical curved concave surfaces 30b in its right and left portions.

The ends of the right and left concave surfaces 30b of the stabilizer 30 have the same height in the vertical direction, as is apparent from FIG. 6B. In this case, it is preferred that the recording/reproducing head 4 (pickup head) is disposed at a slightly upstream position of the stabilizer's centerline 30c in the disk rotational direction.

The position of the recording/reproducing head 4 can also be taken in the position (180-degree reverse side) of the point symmetry on the basis of the disk center of rotation, and it is also possible to make a transfer rate increase using two recording/reproducing heads 4.

The disk rotating device shown in FIG. 4 is provided with two kinds of the stabilizers. This disk rotating device further includes a flexible stabilizer 31 disposed between the stabilizer 30 and the disk 1. The flexible stabilizer 31 has flexibility, and this flexible stabilizer 31 may be formed of a high polymer film, such as polycarbonate, polyethylene terephthalate, or polyimide. The thickness needed for the flexible stabilizer to act effectively in the case of polycarbonate is in a range of 75-300 micrometers, and the thickness needed for the flexible stabilizer to act effectively in the case of polyethylene terephthalate is in a range of 50-200 micrometers.

The flexible stabilizer may be formed of a metallic foil. For example, a stainless steel foil, copper foil, etc., may be used to form the flexible stabilizer with a desirable thickness of about 30-100 micrometers.

The disk 1 and the flexible stabilizer 31 may be connected together and may be accommodated in a disk cartridge. The embodiment of FIG. 5 is arranged so that the stabilizer 30 may be rotated together with the disk 1. In the disk rotating device of this embodiment, the stabilizer 30 and the disk 1 may be arranged in a disk cartridge.

Some examples of the disk rotating device of the invention are shown in FIG. 7-11. The first embodiment shown in FIG. 7 includes a disk assembly 8 which is disposed around the center of a disk 1, and a disk drive device 20.

In the first embodiment, the elastic bodies 7 are arranged on the surface of the holding part 1a of the disk 1 on the side of the turntable 5, and on the disk holding surface of the damper 6, and has composition with which disk 1 is held from both sides with the elastic bodies 7 at the time of the disk clamp to the spindle 3.

In this embodiment, the hub 2 is formed on the elastic bodies 7 provided in the disk 1. For example, it is preferred to use an elastic adhesive for bonding the hub 2 to the elastic bodies 7, which will turn into an elastic body after the elastic bodies 7 are cured. The elastic bodies 7 and the turntable 5 are able to lose the hub 2 and to consider it as the form which touches directly.

The disk drive device 20 and the recording/reproducing head constitute a recording and reproducing device of an embodiment of the invention.

Figure 8:
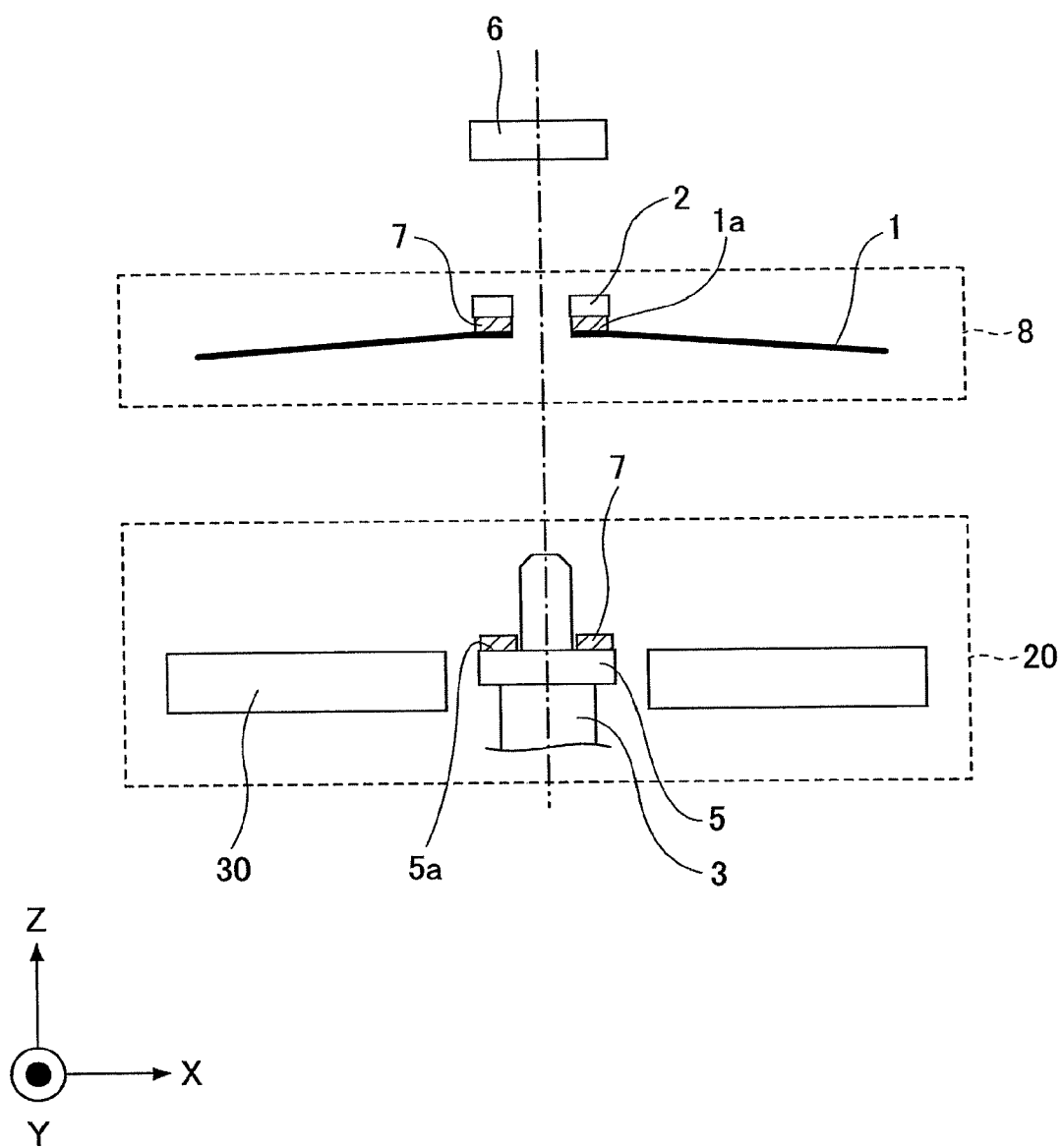
FIG. 8 is an exploded cross-sectional view of an example of the disk rotating device taken along the line C-C' indicated in FIG. 1.

The second embodiment is shown in FIG. 8. In the second embodiment, the elastic bodies 7 are arranged on the surface of the holding part 1a of the disk 1 on the side of the clamper 6, and on the disk holding surface 5a of the turntable 5, and with the elastic bodies 7, the disk 1 is held on both sides when clamping the disk 1 to the spindle 3.

Although the composition which forms the hub 2 on the elastic bodies 7 provided on the disk 1 is shown, the method of pasting up the hub 2 as elastic adhesive which serves as an elastic-property object after curing the elastic bodies 7 is preferred. The elastic body 7 and the disk damper 6 are able to lose the hub 2 and to consider it as the form which touches directly.

Figure 9:
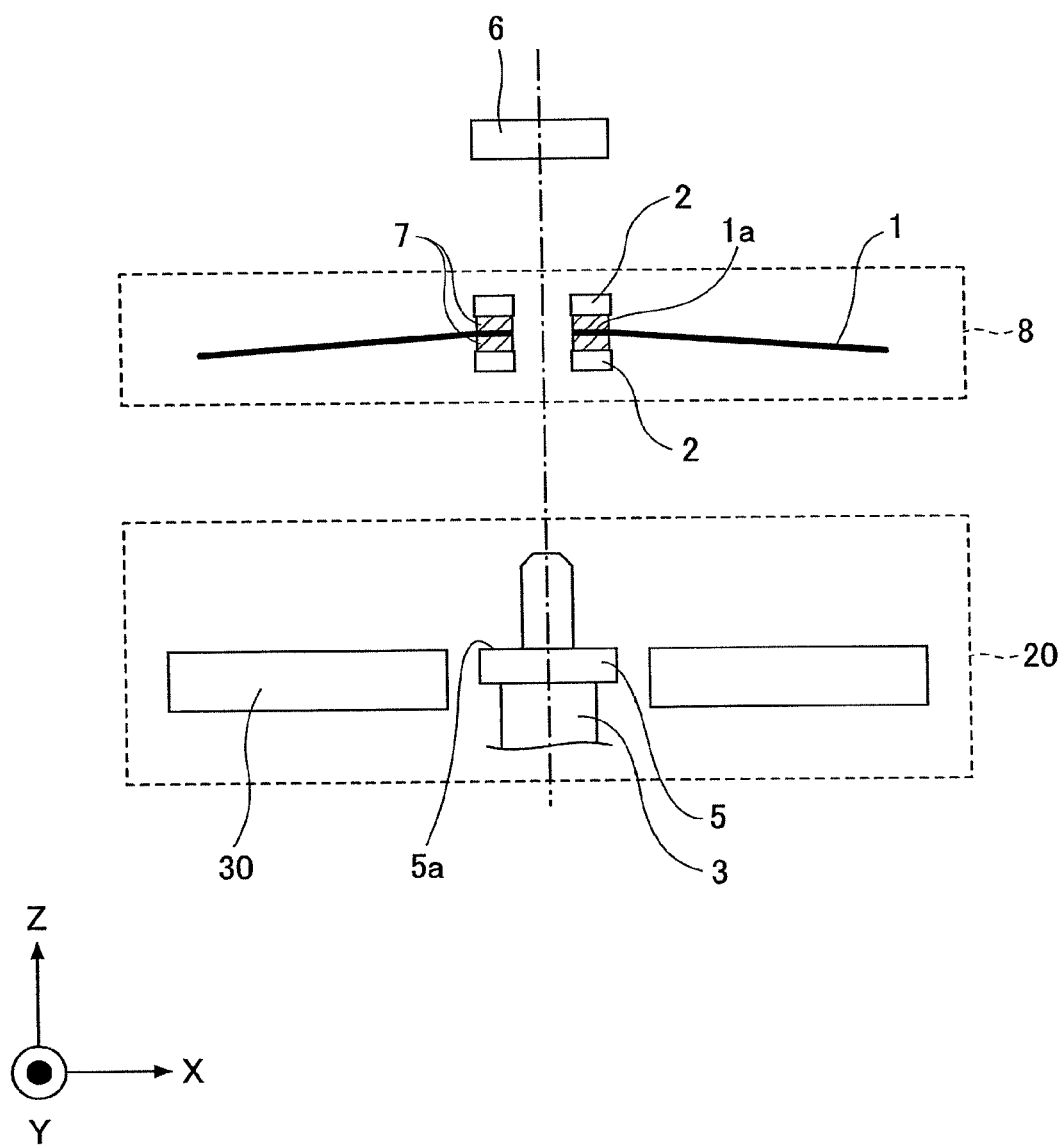
FIG. 9 is an exploded cross-sectional view of an example of the disk rotating device taken along the line C-C' indicated in FIG. 1.

The third embodiment is shown in FIG. 9. The third embodiment makes both sides of holding part 1a of the disk 1 possess the elastic bodies 7, and has the composition in which the disk 1 is held from both sides with the elastic bodies 7 at the time of the disk clamp to the spindle 3.

Although the form which forms the hub 2 on the elastic bodies 7 which the disk 1 is made to possess is shown, the method of pasting up the hub 2 as elastic adhesive which serves as an elastic-property object after curing the elastic bodies 7 is preferred. It is also possible to lose the hub 2 and to consider it as the elastic bodies 7 and the form which the turntable 5 and the damper 6 touch directly.

Figure 10:
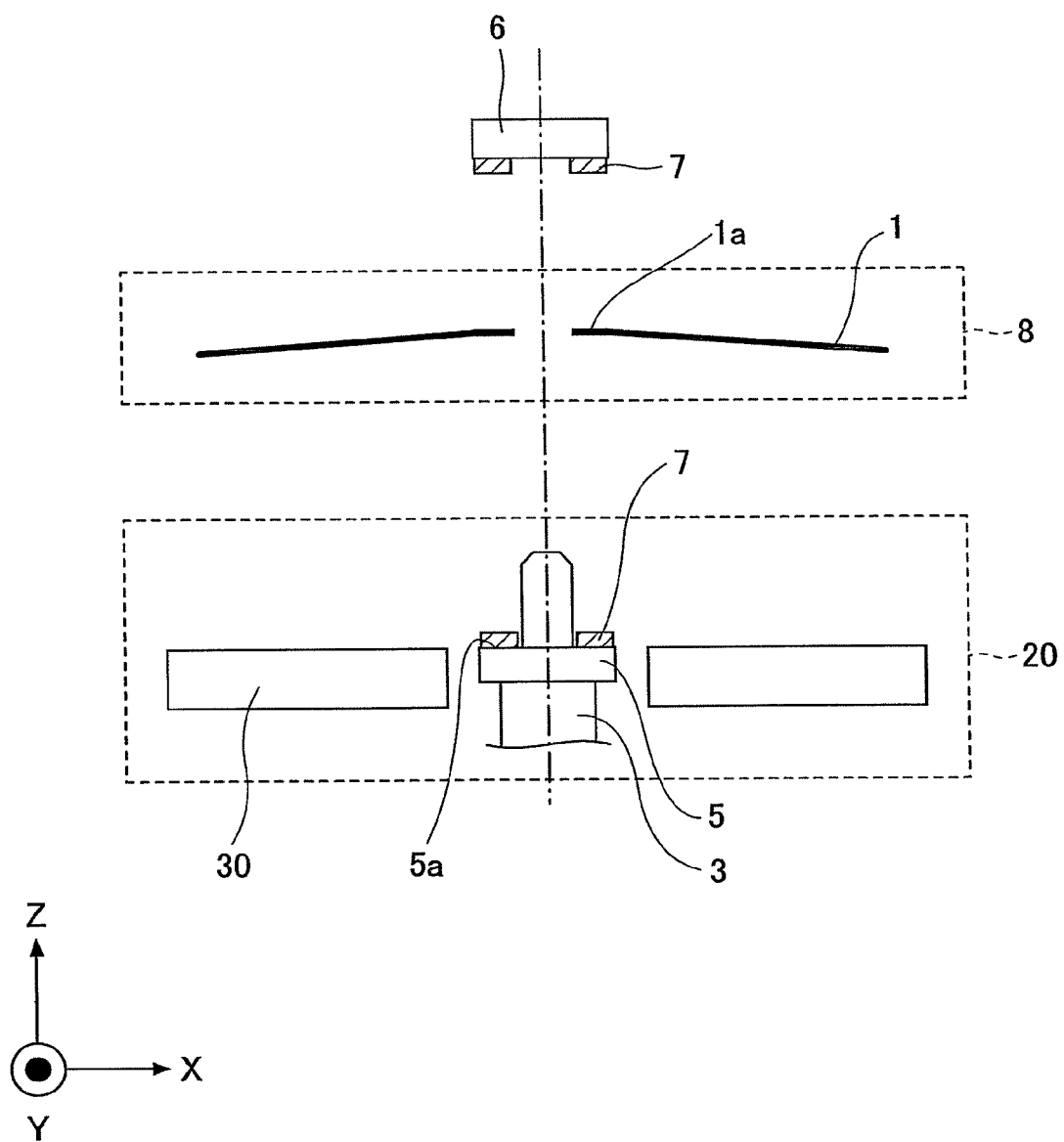
FIG. 10 is an exploded cross-sectional view of an example of the disk rotating device taken along the line C-C' indicated in FIG. 1.

The fourth embodiment is shown in FIG. 10. The fourth embodiment makes the disk holding surface of the disk damper 6 and the turntable 5 possess an elastic-property object, and has the composition in which the disk 1 is held from both sides with the elastic bodies 7 at the time of the disk clamp to the spindle 3.

Figure 11:
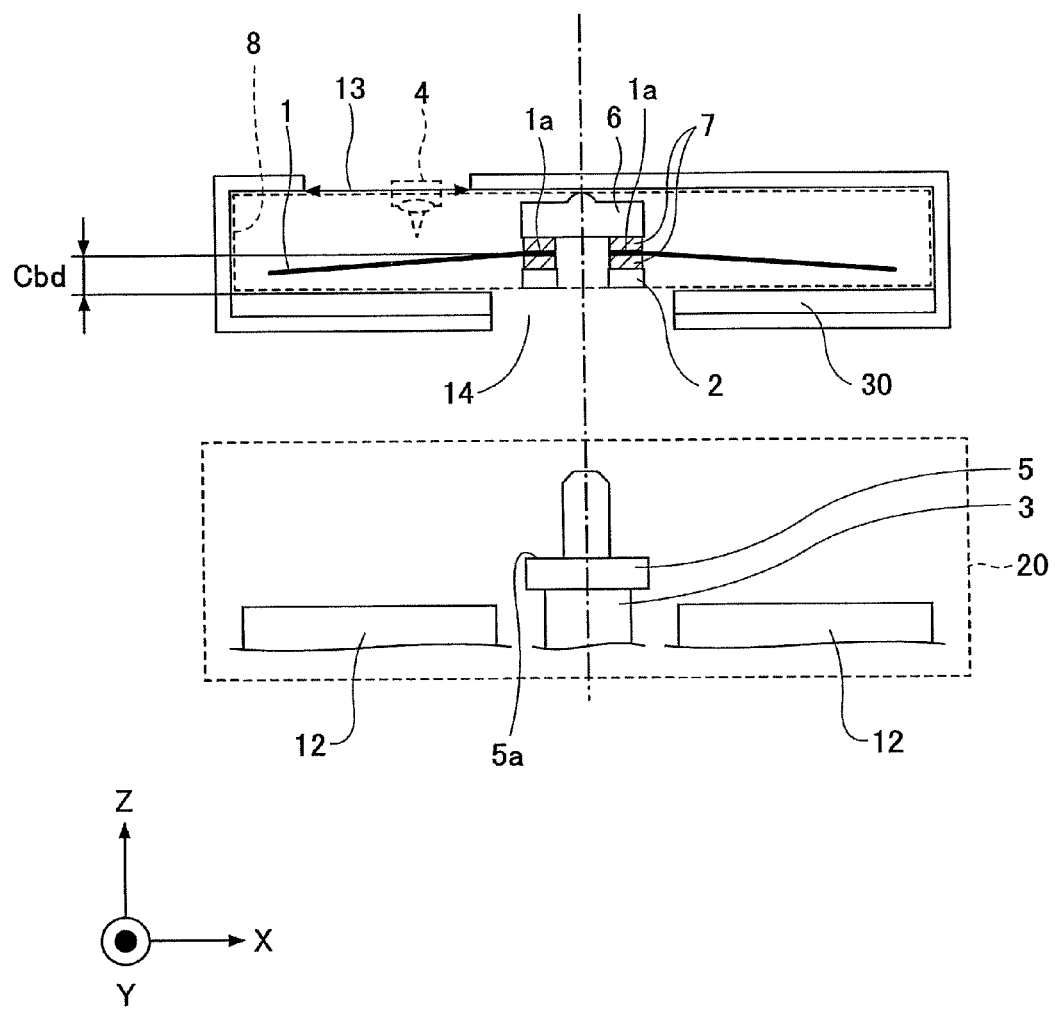
FIG. 11 is an exploded cross-sectional view of a disk system.
Figure 12:
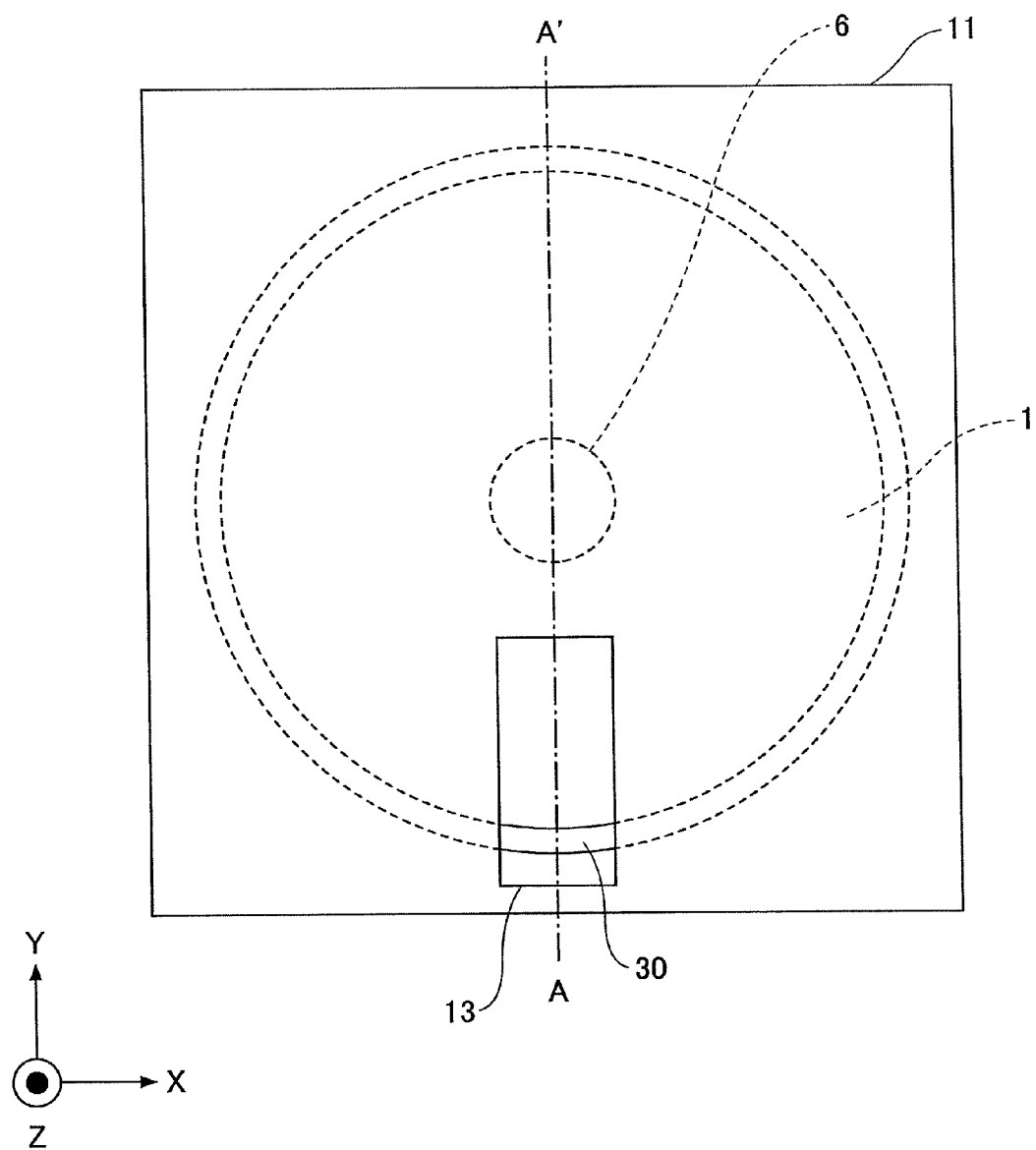
FIG. 12 is a diagram showing a disk cartridge in the disk system of FIG. 11.

Although here described on the basis of the form which carries out loading of the disk 1 to the drive device 20 independently. For example, as shown in FIG. 11 and FIG. 12, it is good also as a form which carries out loading to disk drive device 20 and which is driven where the disk assembly 8 containing the disk 1, the elastic bodies 7, and the damper 6 is accommodated in the disk cartridge 11.

In the disk rotating device of this embodiment, it is important to hold the disk 1 on both the sides by the elastic bodies 7. The positioning mechanism of a cartridge Z shaft position for 12 to set up the adjustment value of relative position Cbd in the Z axial direction between the spindle 3 and the disk cartridge 11 in FIG. 11 and FIG. 12, the opening for recording/reproducing head access for 13 to perform recording and reproducing (pickup head) 4 accessing disk 1 and 14 are the openings for spindle access for connecting the spindle 3 with the disk assembly 8.

In the disk rotating device described above, the stabilizer 30 is arranged on the back surface of the disk, even if it arranges the stabilizer 30 in the disk rotating device of the invention on the front surface of the disk 1, it has the same effect.

The stabilizer 30 may be arranged on both the front and back surfaces of the disk 1. It is arranged in order to hold the disk 1 on the turntable 5 and to transmit the rotating force of the spindle 3 to the disk 1, but the clamp 6 is not required if the disk 1 can be held on the turntable 5 so that the driving force of the spindle 3 can be transmitted. For example, a magnetic substance is included in the portion where the holding part 1a of the disk 1 and the disk holding part 5a of the turntable 5 face each other, it may join together by magnetism and disk 1 and the turntable 5 may be held.

Figure 13:
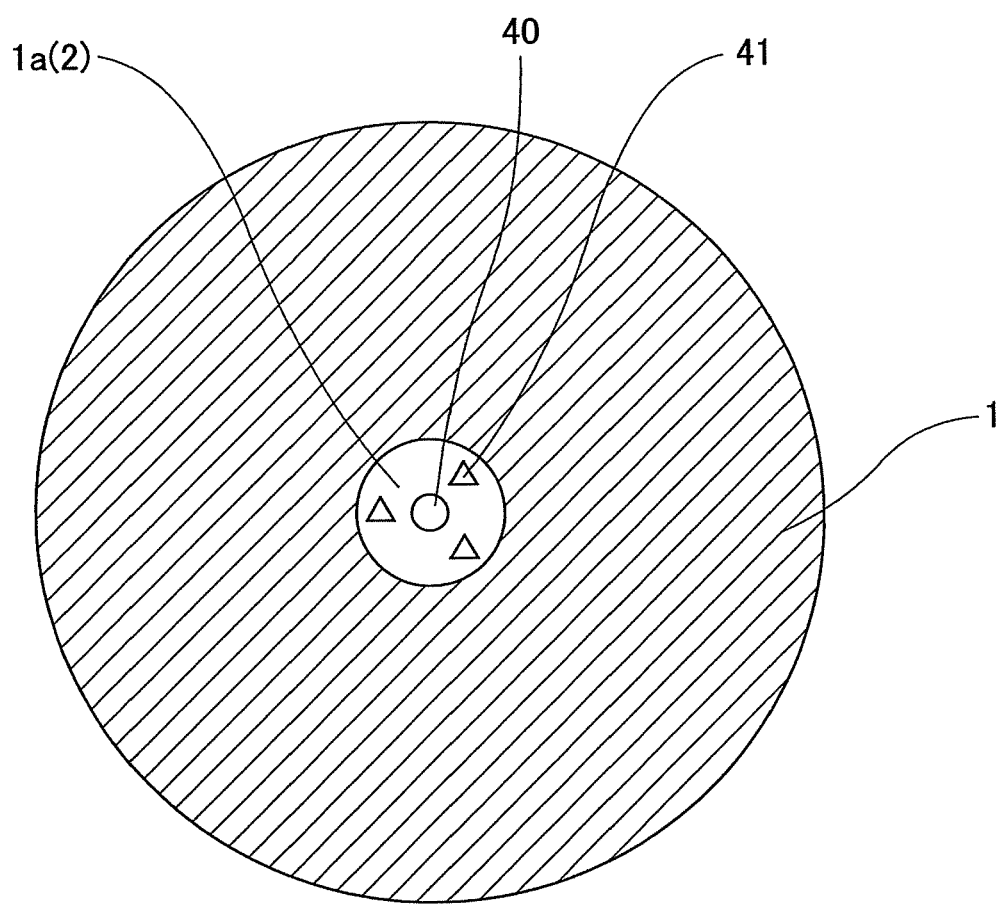
FIG. 13 is a plan view of a disk of an embodiment of the invention.

Next, the example which does not fix and pinch the disk 1 between the turntable and the clamp as the fifth embodiment is shown. As shown in FIG. 13, the hub 2 is arranged on the disk 1, and a feed hole 40 and two or more openings 41 are formed in the holding part 1a of the disk 1.

The feed hole 40 of the center of rotation is an object for fitting with a spindle, and has other at least two openings 41. There is no case of the feed hole 40 of the center of rotation of the disk 1 shown in FIG. 14. There is no case of two hub of the disk 1 shown in FIG. 15, and it is made into the holding part of the disk 1 with disk 1 and the composition which arranges six circular openings 41 in each train in the shape of a concentric circle at two rows. Thus, if the configuration and arrangement of the openings 41 are improved, the hub 2 is not necessarily indispensable.

For example, 3 to 12 circular openings 41 may be arranged, in each of 1 to 3 rows of concentric circles coaxial to the disk 1, on the holding part of the disk 1.

Figure 16:
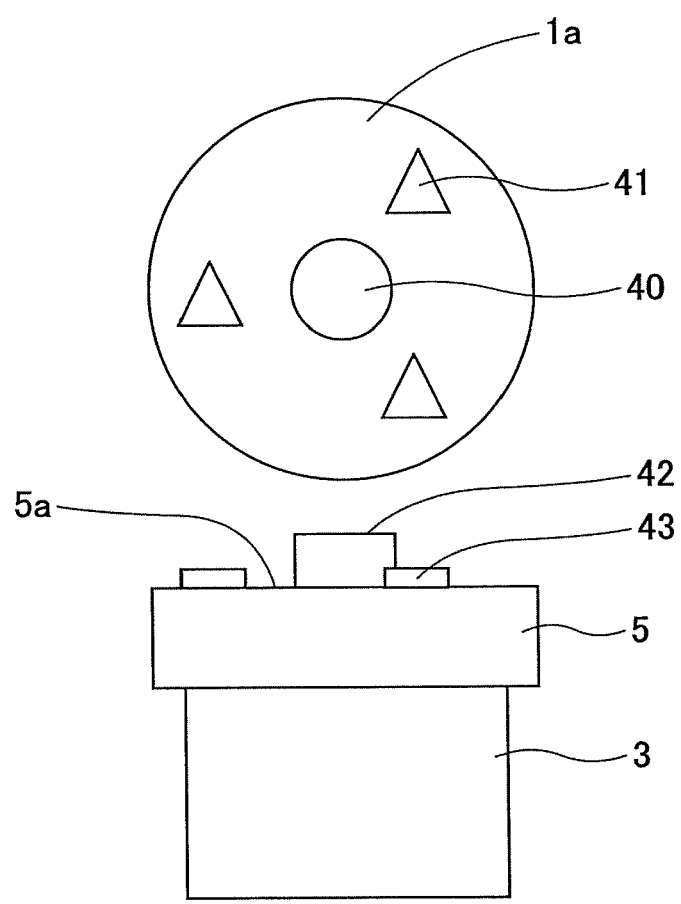
FIG. 16 is a diagram showing the relation of the disk holding part of a turntable and the holding part of a disk.

As shown in FIG. 16, a center boss 42 corresponding to the spindle 3, and two or more projections 43 are arranged on the turntable 5. When holding the disk 1 on the turntable 5, a center hole 40 of the disk 1 is fitted into the center boss 42, and the plural openings 41 are fitted into the plural projections 43.

Figure 14:
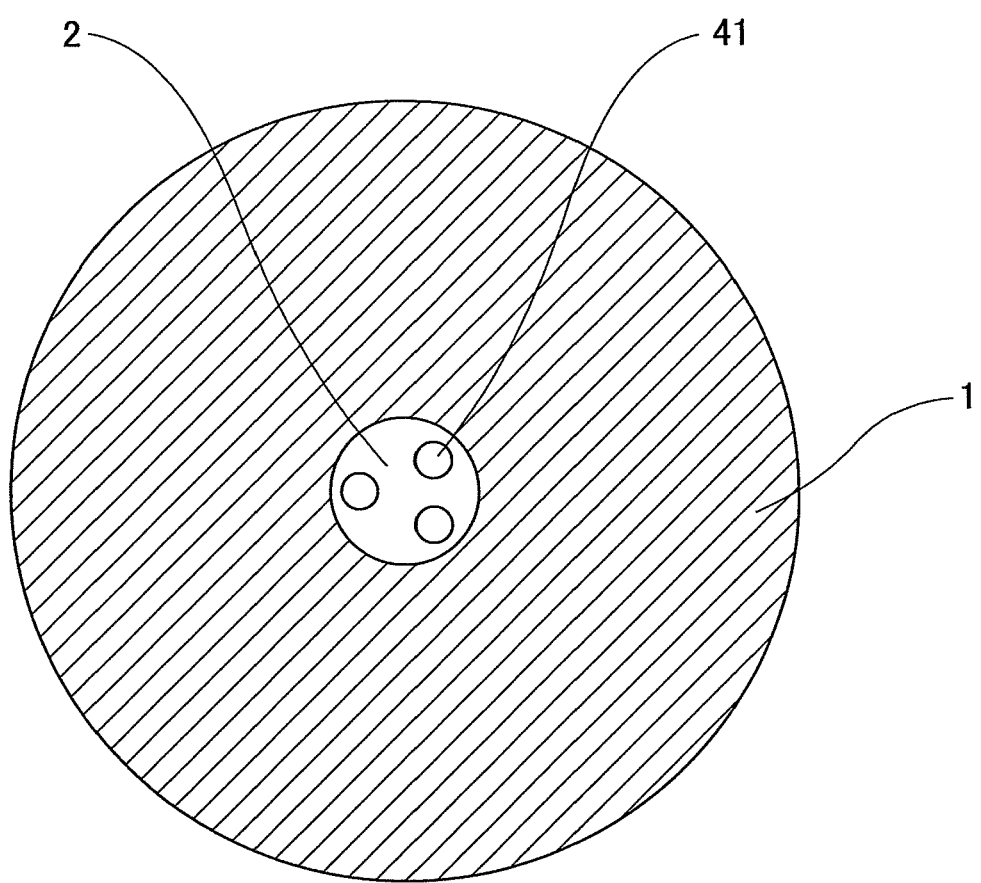
FIG. 14 is a plan view of a disk of an embodiment of the invention.
Figure 15:
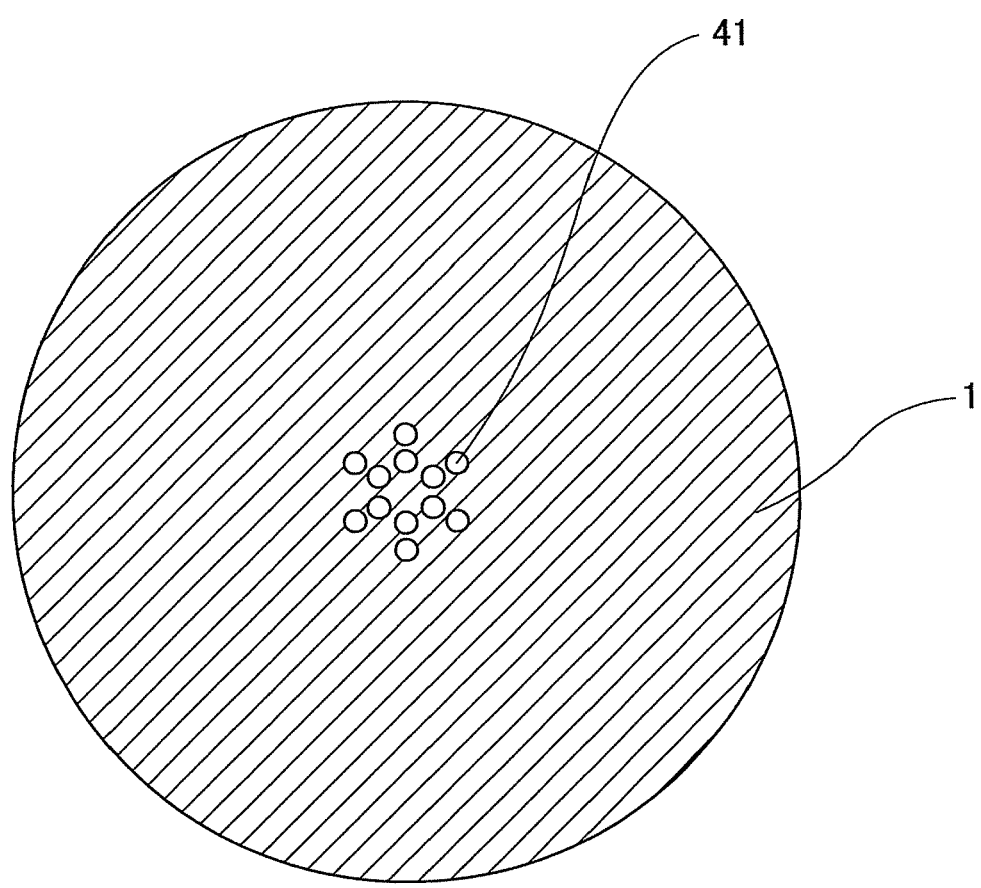
FIG. 15 is a plan view of a disk of an embodiment of the invention.
Figure 17:
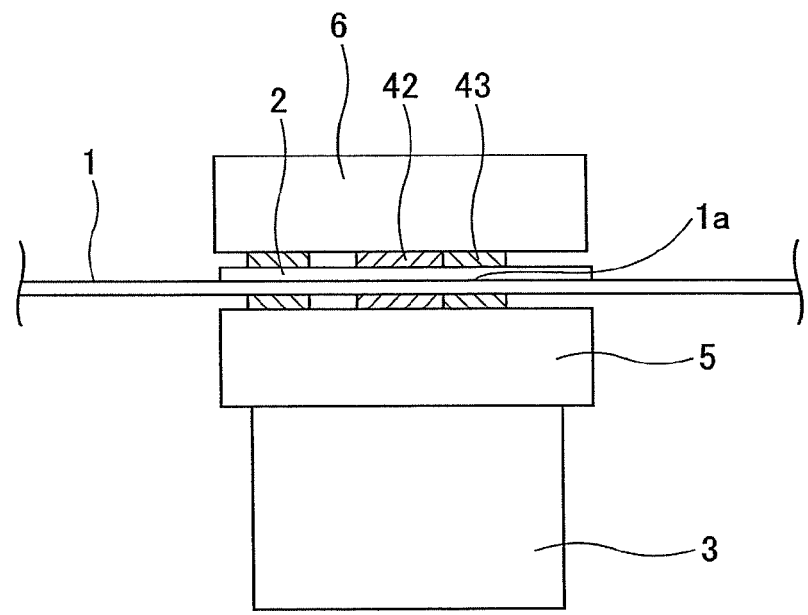
FIG. 17 is a diagram showing a condition of the disk rotating device of FIG. 9 in which the disk of FIG. 13 is held using the turntable of FIG. 16.

FIG. 17 shows the condition in which the disk 1 is held on the turntable 5. In the embodiment of FIG. 17, the clamp 6 is arranged on the front surface of the disk. However, this clamp 6 is not in contact with the disk 1. Namely, the disk 1 is held between the turntable 5 and the clamp 6, but the disk 1 is slightly movable in the vertical direction (for example, about 0.1 mm). If the disk 1 can be attracted to the turntable 5 by magnetism or the like, the clamp 6 may not be used. If the disk shown in FIG. 14 is used, a turntable 5 having no center boss 42 may be used.

As described above, the disk rotating device shown in FIG. 17 is held on the turntable such that the disk 1 does not receive any stress from the damper 6 and the turntable 5.

When the turntable 5 is rotated, the rotating force is transmitted to the disk 1 via the projections 43 of the turntable 5 and the openings 41 of the disk 1, so that the disk 1 is rotated.

When the disk 1 is rotated at a high speed in this state, the flexible disk 1 will be extended in the radial direction by the centrifugal force. However, the pinching stress arising when the disk rotating device according to the related art is used does not act on the disk 1.

For this reason, without fixing the deformation, the disk 1 can return to the original state easily with the elasticity of the disk itself, when it slows down to a low speed rotary after a high speed revolution.

There is no stress concentration to the holding part 1a peripheral part of the disk 1 accompanying roll acceleration generated when changing rotational speed especially. For this reason, it is difficult to generate distortion of the holding part 1a peripheral part neighborhood of the disk 1.

As for the opening 41 of the disk 1 in this embodiment, the clearance of at least 20 micrometers or more is made larger enough than projection 43 is preferred. If it carries out like this, also in the state where the disk at the time of a high speed revolution is extended to the radial direction, the fault of these form the disk inner periphery is distorted more incongruently is cancelable.

As for the construction material of hub 2, it is desirable to constitute from same material as disk 1 or material with equivalent Young's modulus. For example, the disk 1 is formed of a polycarbonate resin with the thickness of 0.1 mm, and methods, such as attaching the same 1-mm-thick hub 2 made of a polycarbonate resin, are raised.

The same effect is acquired also by the method of utilizing the elastic-property object which constituted the hub 2 of a rigid body, such as stainless steel, and is adopted by the above-mentioned embodiments 1-4 between this and the disk 1.

If the form and arrangement of the openings 41 are devised as already explained, the hub 2 bends that it is not necessarily indispensable, and also has a case.

Next, a description will be given of some examples of the disk rotating device of the invention and some comparative examples.

Example-1 will be described. In the example-1, the disk rotating device of the second embodiment shown in FIG. 8 is used. The disk assembly 8 is loaded to the disk drive device 20, and a repeatability test is carried out for 100 cycle repetitions, each cycle including the operations of seven steps according to the pattern shown in Table 1 below, in which the disk rotational speed and the parameter value Cbd are changed at each step.

The stabilizer 30 of the disk drive device 20 has the surface, facing the disk 1, which is formed into the curved concave surface shown in FIG. 6B, and made of a stainless steel material.

The specific configuration of the stabilizer 30 is as follows. The outside diameter is 130 mm, the inside diameter is 35 mm, the flat part width Wcf near the centerline is 30 mm, and the radius of curvature R of the cylindrical curved concave surface is 1000 mm. The annular elastic bodies 7 which are made of a 0.05-mm thick silicone are arranged on the turntable 5.

The disk assembly 8 is prepared in the following manner. A sheet of polycarbonate with the diameter of 120 mm and the thickness of 80 micrometers is used as the base material of the disk 1. First, the grooves with the pitch of 0.6 micrometers and the width of 0.3 micrometers (15 micrometers in thickness) are transferred from the stamper to this sheet by heat transfer. Then, the films are deposited on the sheet by sputtering in order of the films of $Si_3N_4$ 10 nm/ZnS—$SiO_2$ 25 nm/AgInSbTeGe 10 nm/($ZrO_2$—$Y_2O_3$)—$SiO_2$ 7 nm/Ag reflective layer 120 nm. The information recording portion of the disk is set in the range from the inside periphery diameter of 50 mm to the outside peripheral diameter of 116 mm (or the range of 25 mm-58 mm in radius).

Then, the spin coating of an UV resin is performed and the UV resin is cured by irradiation of ultraviolet rays so that the transparent protective film with the thickness of 10 micrometers is formed on the surface of the disk 1. The hard coat with the thickness of 10 micrometers is formed on the opposite surface of the disk 1. The hub 2 made of a stainless steel foil with the outer diameter of 29 mm, the inside diameter of 15 mm, and the thickness of 0.1 mm is attached to one side (opposite to the information recording layer forming side) of the central part of the thus produced disk 1 with an adhesive (0.05 mm in thickness). The assembly of the disk assembly 8 is performed after matching each component with the central axis of the disk.

The disk assembly 8 is arranged in the above-mentioned disk drive device 20, and the disk 1 is held to the turntable 5, and a repeatability test is carried out. In the repeatability test, the rotational speed of the spindle 3 (which is the same as the rotational speed of the disk 1) and the parameter value Cbd are managed according to Table 1 (refer to FIG. 6A), where Cbd is a clearance setting in the direction of rotating axis between the surface (which is equivalent to the turntable 5 side surface of the holding part 1a of the disk 1) of the elastic bodies 7 on the turntable 5 and the surface flat parts 30a (Wcf section) of the stabilizer 30.

In the repeatability test, the gap between the disk 1 and the stabilizer 30 at the radial position of 36 mm on the pickup scan line was measured at rotational speed of 4000 rpm, where the Cbd was set to 0.1 mm. The measurement was carried out after 1 cycle and 100 cycle of the repeatability test. The decreasing ratio of the gap from 1 cycle to 100 cycles was calculated based on the results mentioned above. The decreasing ratio of 0% means that the disk 1 has no deformation after the repeatability test. The decreasing ratio of 100% means that the disk 1 contacts the surface of the stabilizer 30. The test results of the example-1 are illustrated in Table 2.

TABLE 1

| | Disk Rotational Speed (rpm) | Parameter Value Cbd (mm) |
|---|---|---|
| Step 1 | 0 | 2 |
| Step 2 | 4000 | 2 |
| Step 3 | 4000 | 0.1 |
| Step 4 | 15000 | 0.1 |
| Step 5 | 4000 | 0.1 |
| Step 6 | 4000 | 2 |
| Step 7 | 0 | 2 |

TABLE 2

Gap Decreasing Ratio After 100 Repetitions
Rotational Speed: 4000 rpm, Position: 36 mm

| | |
|---|---|
| Example-1 | 4% |
| Example-2 | 4% |
| Example-3 | 1% |
| Example-4 | 1% |
| C. Example-1 | 53% |
| C. Example-2 | 10% |
| C. Example-3 | 21% |

Example-2 will be described. A repeatability test is carried out for 100 cycle repetitions, each cycle including operation which carries out loading of the disk assembly 8 to drive device 20 by the disk rotating device of the third embodiment shown in FIG. 9 and to which disk rotational speed and the parameter value Cbd are changed by the pattern shown in Table 1 like the example-1. The same component as in the example-1 is used for the stabilizer 30. The disk assembly 8 is prepared in the following manner. The same composition as in the example-1 is used for the disk 1.

The hub 2 which is made of a stainless steel foil with the outside diameter of 29 mm, the inside diameter of 15 mm and the thickness of 0.1 mm is attached to both sides of the central part of the disk 1 using an elastic adhesive (which is 0.05 mm in thickness) as the elastic bodies 7. This attachment is performed after uniting each part material with the same axle. In this drive device 20, no elastic body 7 is arranged on the turntable 5. The repeatability test is performed similar to the example-1. The result is illustrated in Table 2.

Example-3 will be described. The loading of the disk assembly 8 is carried out to drive device 20 with the composition shown in the fourth embodiment of FIG. 10. The same component as in the example-1 is used for the stabilizer 30. The annular elastic bodies 7 which are made of a 0.20-mm thick silicone are arranged on the front surface of the turntable 5 and on the back surface of the disk clamper 6. The disk 1 of the example-1 is used in the disk assembly 8 and no elastic body 7 is arranged there. The repeatability test is carried out similar to the example-1 using the above-mentioned disk rotating device. The result is illustrated in Table 2.

Example-4 will be described. The disk drive device 20 shown in the embodiment of FIG. 9 is used. The disk 1 of the embodiment of FIG. 13 is rotated by the holding state shown in FIG. 17 using the turntable 5 of the form shown in FIG. 16, and like the example-1, by the pattern shown in Table 1, operation to which disk rotational speed and the parameter value Cbd are changed is repeated, and is performed. The stabilizer 30 is the same as in the example-1. The same material and composition as in the example-1 are used for the disk 1.

The hub 2 which is made of a polycarbonate with the outside diameter of 29 mm, the inside diameter of 15 mm, and the thickness of 1 mm is attached to one side of the central part of this disk 1, and 8 mm feed hole 40 in diameter is formed in the center so that it might become point symmetry from the center about three pieces around it in with an one-side regular triangle 8 mm regular triangle opening 41.

Attachment of this disk 1 is performed after uniting each part material with the same axle. In the rotation, the height of projection 43 for rotation transmission corresponding to opening 41 is 1.15 mm, is in the state which dashed damper 6 against this, and set disk assembly 8 on the turntable 5.

Among 1.15 mm put by the turntable 5 and the damper 6, the disk assembly 8 of 1.10 mm of the total thickness is set, and a 0.05 mm clearance is formed in a shaft direction. The repeatability test has been carried out similar to the example-1 using the above-mentioned disk rotating device. The result is illustrated in Table 2.

Comparative example-1 will be described. In the comparative example-1, with the composition shown in FIG. 18, operation to which disk rotational speed and the parameter value Cbd are changed is repeated, and is performed with the pattern shown in Table 1. The same component as in the example-1 is used for the stabilizer 30. The turntable 5 and the damper 6 are formed of the stainless material. The same component as in the example-1 is used for disk 1. The repeatability test has been carried out similar to the example-1 using the above-mentioned disk rotating device. The result is illustrated in Table 2.

Comparative example-2 will be described. The turntable 5 and the damper 6 made it the stabilizer 30 with the stainless material with the composition shown in FIG. 18 using the same condition as in the example-1. The same component as in the example-1 is used for disk 1. Except for the rotational speed of step 4 of the pattern shown in Table 1 being changed from 15000 rpm to 10000 rpm, the repeatability test has been carried out using the above-mentioned disk rotating device in the same conditions as for the example-1. The result is illustrated in Table 2.

Comparative example-3 will be described. Except for the hub 2 and the elastic bodies 7 in the disk assembly 8 in the composition of the example-1 being omitted (the elastic body 7 is arranged only on the bottom surface of the disk 1), the repeatability test is carried out in the same conditions as in the example-1. The result is illustrated in Table 2.

In the comparative example-1, after the repeatability test is performed for 100 repeat cycles, the disk 1 contacted and slid with the stabilizer 30, and the fault causing the spindle to stop occurred. This phenomenon was produced because the distortion (which was accumulated and increased in the inner periphery of the disk 1 through the repetition operation) caused the disk 1 and the stabilizer 30 to be brought in proximity with each other at low rotational speeds.

This proximity situation is expressed in FIG. 19 as a gap between the stabilizer and the disk. It is apparent from FIG. 19 that the disk and the stabilizer, initially maintained the fixed gap therebetween, approached each other after the repetition operation of 100 cycles, and contacted each other at two places (the disk radial positions of 25 mm and near 52 mm). This was the test result at the rotational speed of 4000 rpm.

For example, the test result of the example-3 according to the invention was as shown in FIG. 20. As shown in FIG. 20, when the number of repetitions is 1000, the proximity situation of the disk 1 and the stabilizer 30 as in the comparative example-1 was not seen. The gap between the disk 1 and the stabilizer 30 did not decrease on the pickup scan line, and the contact or slide between them were prevented from beginning to end through the repetition operation.

In FIG. 18 and FIG. 20, the decreasing ratio of the gap after 100 repetitions in the disk radius position of 36 mm is shown in Table 2. This index shows that a stable drive can be carried out, without causing the contacting of the disk 1 and the stabilizer 30 through the repetition operation. It is preferred that the value of this index is as small as possible. In the examples-1 to -4 of the invention, the good result of less than 5% of the decreasing ratio is obtained.

On the other hand, the comparative example-1 shows the worst value of the decreasing ratio of 53%, which clearly resulted in the fault of the disk rotating device shown in FIG. 18.

In the comparative example-3, the decreasing ratio was improved from the comparative example-1 (53%->21%).

However, the value of the decreasing ratio was still large, which cannot be disregarded. It is judged that the composition of the comparative example-3 is restricted to the use when there is little repetition operation, and the practicability thereof is low.

The comparative example-2 is an example in which the disk rotational speed is limited to 10000 rpm or less. The decreasing ratio is around 10%, which is a comparatively low value. However, this value of the decreasing ratio is not a level equivalent to the practical use. This shows that the above-mentioned fault is a characteristic phenomenon in the rotational speed over 10000 rpm, which had not experienced in the existing disk according to the related art.

Figure 21:
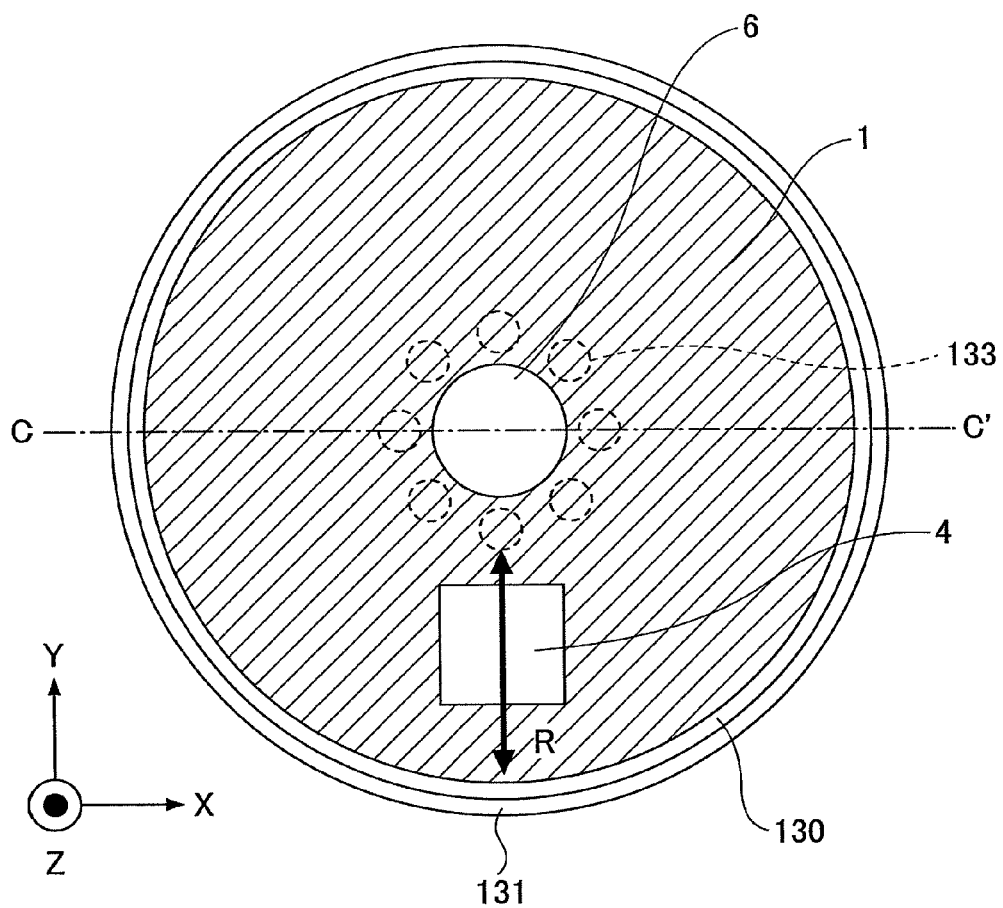
FIG. 21 is a plan view of a disk rotating device of an embodiment of the invention.
Figure 22:
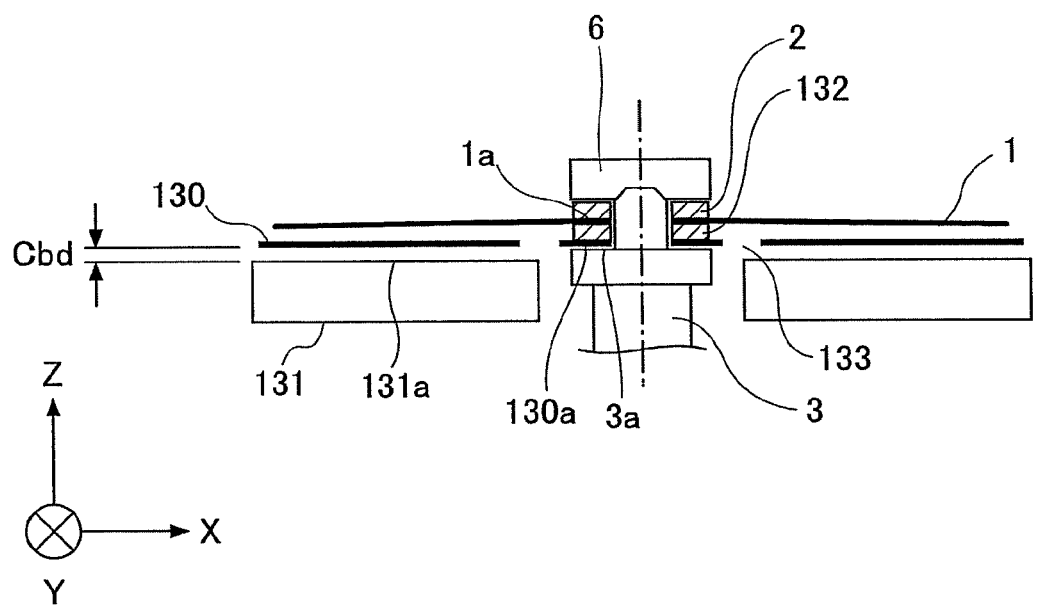
FIG. 22 is a cross-sectional view of the disk rotating device taken along the line C-C' indicated in FIG. 21.

FIG. 21 is a plan view of a disk rotating device and a disk assembly in a recording and reproducing device of an embodiment of the invention, and FIG. 22 is a cross-sectional view of the disk rotating device taken along the line C-C' indicated in FIG. 21.

Reference numeral 1 denotes a disk which is a flexible recording medium. In this embodiment, an optical disk will be described as a typical example of the disk 1. However, the invention is not limited to an optical disk.

Reference numeral 2 denotes a hub which while holds and is a holding component to hold the center portion of the disk 1 in order to rotate the disk 1 around the center of the disk 1.

Reference numeral 3 denotes a spindle. Reference numeral 4 denotes an optical pickup which is a recording/reproducing head which is moved relative to the disk 1 in the radial direction of the disk 1 along the line R and emits a light beam focused on the disk 1 to perform a light scanning and perform recording and reproducing of information.

Reference numeral 130 denotes a first stabilizer that includes a flexible member which is rotated with the disk 1 and stabilizes the rotation of the disk 1. Reference numeral 131 denotes a second stabilizer which stabilizes the rotation of the first stabilizer 130.

Reference numeral 132 denotes a spacer for connecting the first stabilizer 130 with the disk 1, and specifying the relative position of both the Z axis positions. Reference numeral 133 denotes the openings for introducing an air flow between the disk 1 and the first stabilizer 130 when the disk 1 and the first stabilizer 130 are rotated.

It is preferred that the first stabilizer 130 is formed in the shape that is similar to that of the disk 17 and has a diameter that is equal to or larger than the diameter of the disk 1. The thus arranged first stabilizer 130 can easily stabilize the rotation of the disk 1.

The surface 131a of the second stabilizer 131 facing the disk 1 may be a concave surface or a convex surface other than the planar surface as shown in FIG. 22. For example, the surface 131a may be a cylindrical concave surface which is curved in the direction of the C-C' as shown in FIG. 23 or FIG. 25, or may be a cylindrical convex surface.

Moreover, the surface 131a may be formed into any of various shapes, such as a conical concave surface or a conical convex surface. It is preferred that the surface 131a of the second stabilizer 131, facing the disk 1, has a diameter that is equal to the diameter of the disk 1 and equal to or slightly larger than the diameter of the first stabilizer 130. The thus arranged second stabilizer 131 can easily stabilize the rotation of the disk 1 and the first stabilizer 130.

Considering the combination of the recording and reproducing device and the disk shown in FIG. 21 and FIG. 22 as a typical example, the operation which stabilizes the rotation of the disk 1 will be described.

Figure 23:
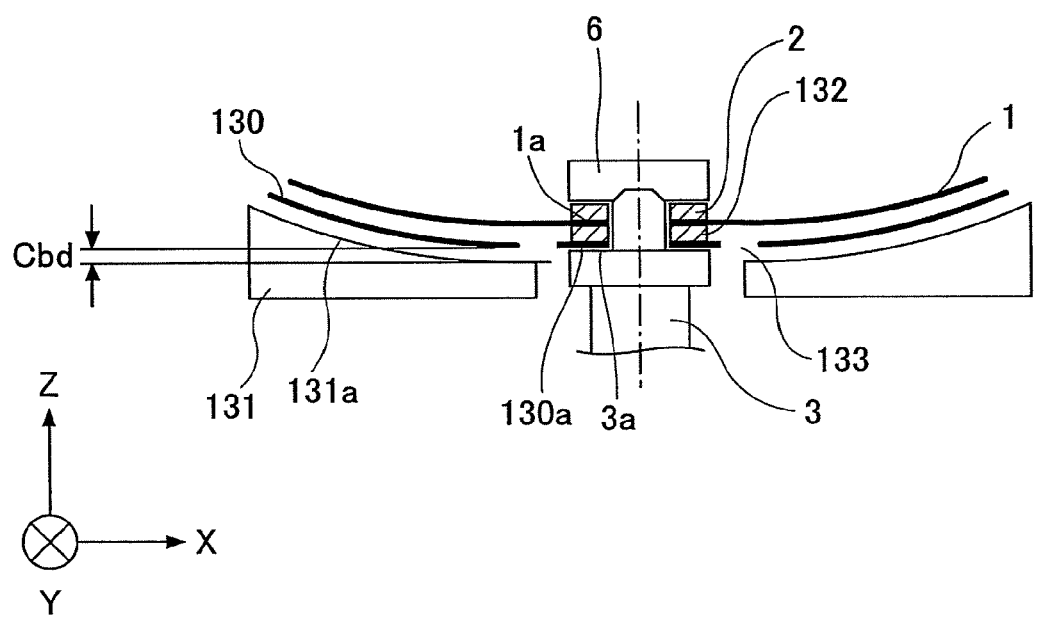
FIG. 23 is a cross-sectional view of the disk rotating device taken along the line C-C' indicated in FIG. 21.

The following operation is also applicable to the second stabilizer which is arranged as shown in FIG. 23 or in another embodiment.

Through the spacer 132, the disk 1 is connected with the first stabilizer 130, and fixed to the rotating shaft of the spindle 3 with the hub 2 and the disk cap 6 (or the disk damper 6).

Figure 24:
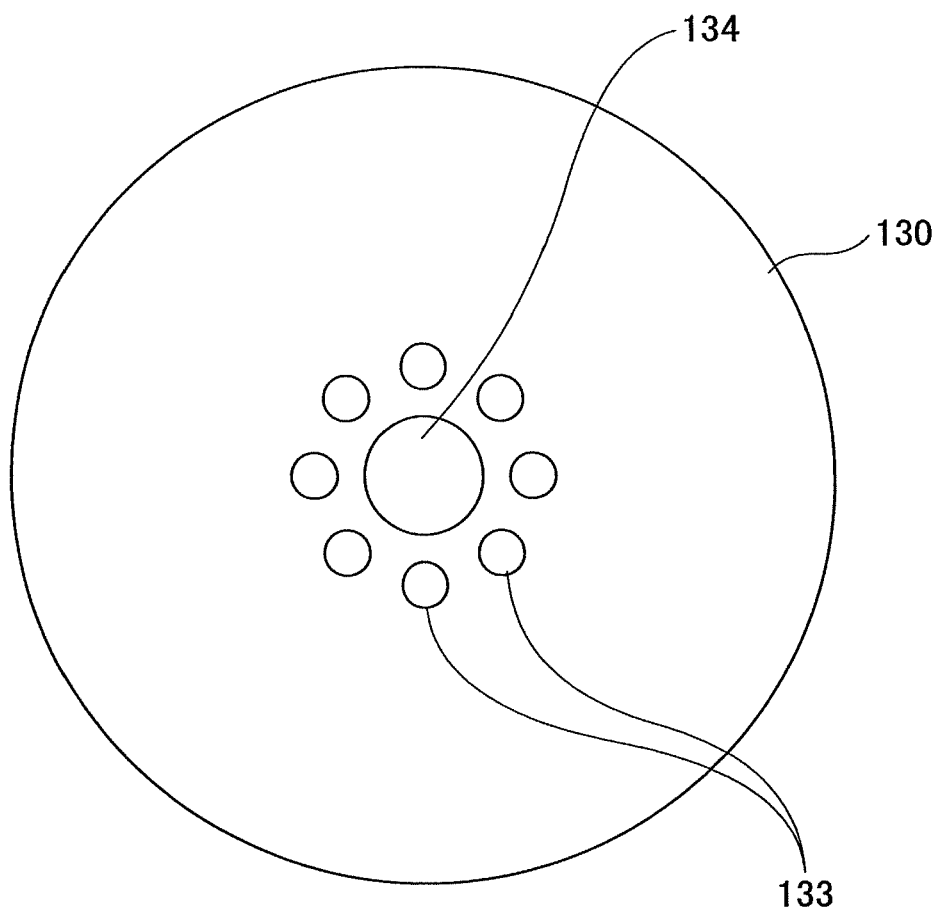
FIG. 24 is a plan view of a first stabilizer.

FIG. 24 is a plan view of a first stabilizer 130 which is flexible and formed into a disk-like shape. The relative positions in Z axis direction of the spindle 3 and the second stabilizer 131 are set up beforehand so that the gap between the first stabilizer 130 and the second stabilizer 131, which is the gap in the Z axis position between the surface 131a of the second stabilizer near the spindle 3, facing the disk 1, and the holding surface 3a of the rotating shaft of the spindle 3 for holding the first stabilizer 130 (indicated by Cbd in FIG. 4) is in a range of 0.05-0.30 mm.

When the first stabilizer 130 and the disk 1 held on the spindle 3 in this state are rotated by the spindle 3, an air bearing is formed between the first stabilizer 130 and the second stabilizer 131, and the first stabilizer 130 which is flexible is rotated with a fixed gap distribution kept over the surface of the second stabilizer. The disk 1 is rotated stably with a fixed gap distribution kept over the surface of the first stabilizer 130 so that the rotation of the disk 1 is stabilized.

In such a proximity state, the first stabilizer 130 and the second stabilizer 131 may contact each other in the transitional state at the time of starting and stopping the rotation. However, even when contacting or sliding of the first stabilizer 130 and the second stabilizer 131 takes place, the disk 1 in which the recorded information is retained faces the second stabilizer 131 through the first stabilizer 130, and there is not any possibility that sliding of the disk 1 and the second stabilizer 131 take place. Even when the disk 1 contacts the first stabilizer 130, the disk 1 and the first stabilizer 130 are rotatable around the common center, there is not any possibility that the disk 1 and the first stabilizer 130 slide mutually, which may damage the information recording portion of the disk 1.

The action of the spacer 132 will be described. By inclusion of the spacer 132, a clearance can be given between the first stabilizer 130 and the disk 1, and the contacting of the first stabilizer 130 and the disk 1 at the time of rotation of the disk 1 can be reduced. Thereby, the contacting of the first stabilizer 130 and the disk 1 is reduced, and the possible deformation of the disk 1 when the two parts contact each other can be avoided, preventing the vibration of the disk 1 accompanied with the deformation.

It is preferred to use the first stabilizer 130 that has the openings 133 near the inside peripheral portion of the disk 1 as shown in FIG. 24. The openings 133 are arranged at the positions shifted from the center, apart from the opening 134 to which the rotating shaft of the spindle 3 is inserted.

It is preferred to form plural openings 133, and it is preferred that the plural openings 133 are arranged to meet the point symmetry around the center of the disk 1. The openings 133 have to be formed at the positions where the air can be circulated when the first stabilizer 130 is combined with the spindle 3 or the disk 1 in the disk rotating device. When the first stabilizer 130 including the openings 133 being formed as shown in FIG. 24 is used, the action of the spacer 132 is made effective. Specifically, air is attracted from the openings 133 of the first stabilizer 130 when the disk is rotated, the air flow in the first stabilizer 130 and the disk 1 is generated, and a fixed clearance between the first stabilizer 130 and the disk 1 is maintained. The contacting of the two components can be avoided, the surface vibration of the disk can be prevented, and the rotation of the disk can be stabilized.

Alternatively, the openings 133 may be formed in the disk 1 (rather than in the first stabilizer 130) or may be formed in both the disk 1 and the first stabilizer 130.

It is preferred that the spacer 132 has a diameter that is smaller than that of the disk 1, and the thickness of the spacer 132 is set correctly. The range of thickness appropriate for the spacer 132 varies depending on the materials and thicknesses of the disk 1 and the first stabilizer 130, and the shape of the surface 131a of the second stabilizer 131 facing the disk 1. The appropriate thickness for the spacer 132 is in a range of 0.05-0.40 mm.

The openings 133 may be formed on the first stabilizer 130 in the portion inside the inside diameter of the information recording portion of the disk 1. The information recording portion of the disk 1 is usually arranged in the region except the inside and outside peripheral portions of the disk 1 as indicated by 1b in FIG. 30. For example, the openings 133 with the diameter of 5 mm may be arranged on the circumference of the diameter of 35 mm at eight regular intervals.

The flat surface shown in FIG. 22 is a simple example of the surface 131a of the second stabilizer facing the disk 1, and the gap indicated by Cbd in FIG. 22 is set to be in a range of 0.05-0.30 mm (this range varies depending on the material and thickness of the first stabilizer), where Cbd is a clearance setting in the direction of the rotating axis between the surface (which is equivalent to the holding surface 3a) of the first stabilizer 130 at the inside fixed portion on the holding surface 3a at the side facing the second stabilizer 131 and the surface 131a of the stabilizer 131. Actually the gap between them has a distribution in the plane in the rotating state of the first stabilizer 130 and the disk 1, so the definition of the Cbd is important.

For the high speed rotation of the disk 1, the surface 131a which is formed into a cylindrical concave surface which is curved in one direction, as shown in FIG. 23, is desired. In this case, the Cbd is a clearance setting in the direction of the rotating axis between the surface (which is equivalent to the holding surface 3a) of the first stabilizer 130 at the inside fixed portion on the holding surface 3a at the side facing the second stabilizer 131 and the surface flat parts 131b (Wcf section) of the stabilizer 131 in FIG. 25 mentioned below. In order to form an effective air bearing between the first stabilizer 130 and the second stabilizer 131, the setting of the gap between the two components is important and the upper limit of the gap exists according to the configuration of the components.

Figure 25A:
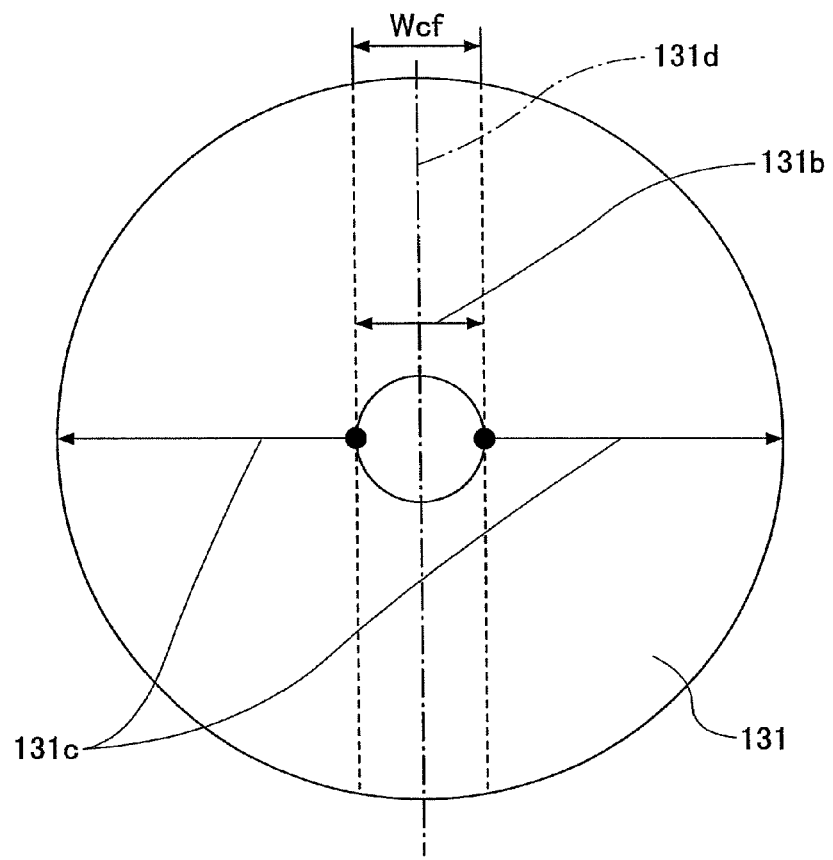
FIG. 25A and FIG. 25B are a plan view and a front view of a second stabilizer.

The use of the cylindrical concave surface of the stabilizer mentioned above is effective in increasing the upper limit of the gap and increasing the upper limit of the rotational speed of the disk. For example, the cylindrical curving surface of the second stabilizer 131 may be formed with a flat part 131b with the width Wcf in the central part, and a cylindrical curved concave surface 131c in each of the sides as shown in FIG. 25A. In this case, it is preferred to locate the recording/reproducing head 4 at the upstream position of the centerline 131d in the rotational direction of the disk.

The position of the recording/reproducing head 4 may be taken in the positions (which are opposite to each other by 180 degrees) of the point symmetry around the center of rotation of the disk, and it is also possible to increase the data transfer rate to the disk by using two record reproducing heads 4 for a single disk.

For example, the first stabilizer 130 may be formed of a high polymer film, such as polycarbonate, polyethylene terephthalate, and polyimide. In a case of polycarbonate, the thickness needed for the first stabilizer to act effectively is in a range of 75-300 micrometers, and in a case of polyethylene terephthalate, the thickness needed for the first stabilizer to act effectively is in a range of 50-200 micrometers.

The first stabilizer 130 that is formed of a high polymer film can be easily and cheaply produced by using a cutting and punching machine. It is preferred to give conductivity to the high polymer film. For example, conductivity can be given to the high polymer film by the method of adding conductive particles to the film in the production process. Also, conductivity can be easily given to the high polymer film by forming a metal or alloy film on a high polymer film by sputtering or vacuum evaporation. By giving conductivity to the high polymer film, it is possible to avoid the contacting of the first stabilizer 130 with the disk 1 or the second stabilizer 131.

The first stabilizer 130 may be formed of a metallic foil. For example, a stainless steel foil, a copper foil, etc. with a thickness in a range of 30-100 micrometers are desired. By the use of a metal foil, the contacting of the first stabilizer with the disk or the second stabilizer can be avoided, and the durability of the first stabilizer can be improved.

In the foregoing description, the case where the spacer 132 is inserted between the first stabilizer 130 and the disk 1 has been explained. However, even when no spacer 132 is inserted, the damaging of the disk during the repeated operations of the high speed rotation of the disk and stopping the rotation can be prevented. When no spacer 132 is inserted between the first stabilizer 130 and the disk 1, the disk 1 and the first stabilizer 130 are likely to contact each other during the rotation. However, the disk 1 and the first stabilizer 130 are rotatable around the common center, and damage to the information recording portion of the disk 1 does not take place. Moreover, the first stabilizer 130 serves as the protective cover of the disk 1, and the vibration of the disk 1 may be prevented.

Figure 26:
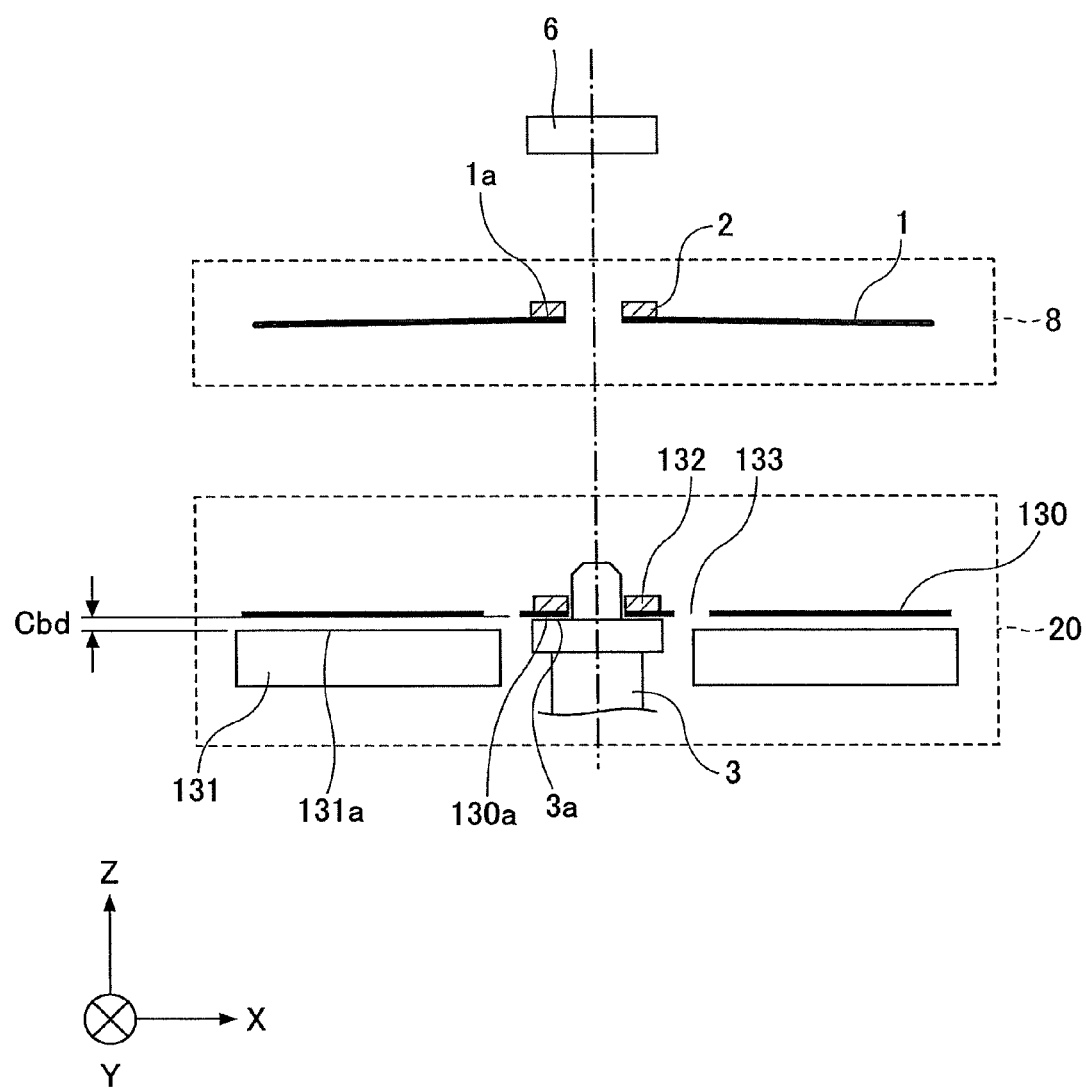
FIG. 26 is an exploded cross-sectional view of an example of the disk rotating device taken along the line C-C' indicated in FIG. 21.

FIG. 26 is an exploded cross-sectional view of an example of the disk rotating device in a recording and reproducing device of an embodiment of the invention. FIG. 26 shows the state of the disk rotating device immediately before the disk assembly is set in the recording and reproducing device of this embodiment.

Reference numeral 8 denotes a disk assembly which includes the disk 1. Reference numeral 20 denotes a drive device which corresponds to the recording and reproducing device of the invention. In this embodiment, the second stabilizer 131, the first stabilizer 130, and the spacer 132 are arranged in the drive device 20 side, in addition to the disk rotating device including the spindle 3. The disk assembly 8 in which the disk 1 and the hub 2 are connected is loaded to the drive device 20 by using the loading mechanism which is not illustrated, so that the disk 1 in the disk assembly 8 is rotated by the disk rotating device.

In this embodiment, the parameter value Cbd of the gap between the first stabilizer 130 and the second stabilizer 131, which is the condition for stabilizing the air flow in the first stabilizer 130 and the second stabilizer 131, and the shape parameter of the spacer 132 and the openings 133, which is the condition for stabilizing the rotation of the disk 1 by the first stabilizer 130 are determined by the design of the drive device 20.

In this embodiment, by including the first stabilizer 130, which is simultaneously rotated with the disk 1, between the disk 1 and the second stabilizer 131, the contacting or sliding of the disk 1 and the second stabilizer 131 can be avoided. For this reason, regardless of the function parts which record information to the disk 1, it is possible to easily maintain the disk rotating device by the repair or exchange of only the first stabilizer 130.

It is preferred that the second stabilizer 131 has the surface 131a which covers at least the whole information recording portion (the portion indicated by 1b in FIG. 30) of the disk 1. Even when the disk 1 is rotated at a high speed over 10000 rpm, the rotation of at least the information recording portion of the disk 1 can be stabilized, and the recording and reproducing of information with the disk 1 can be stably carried out by the record reproducing head.

Figure 27:
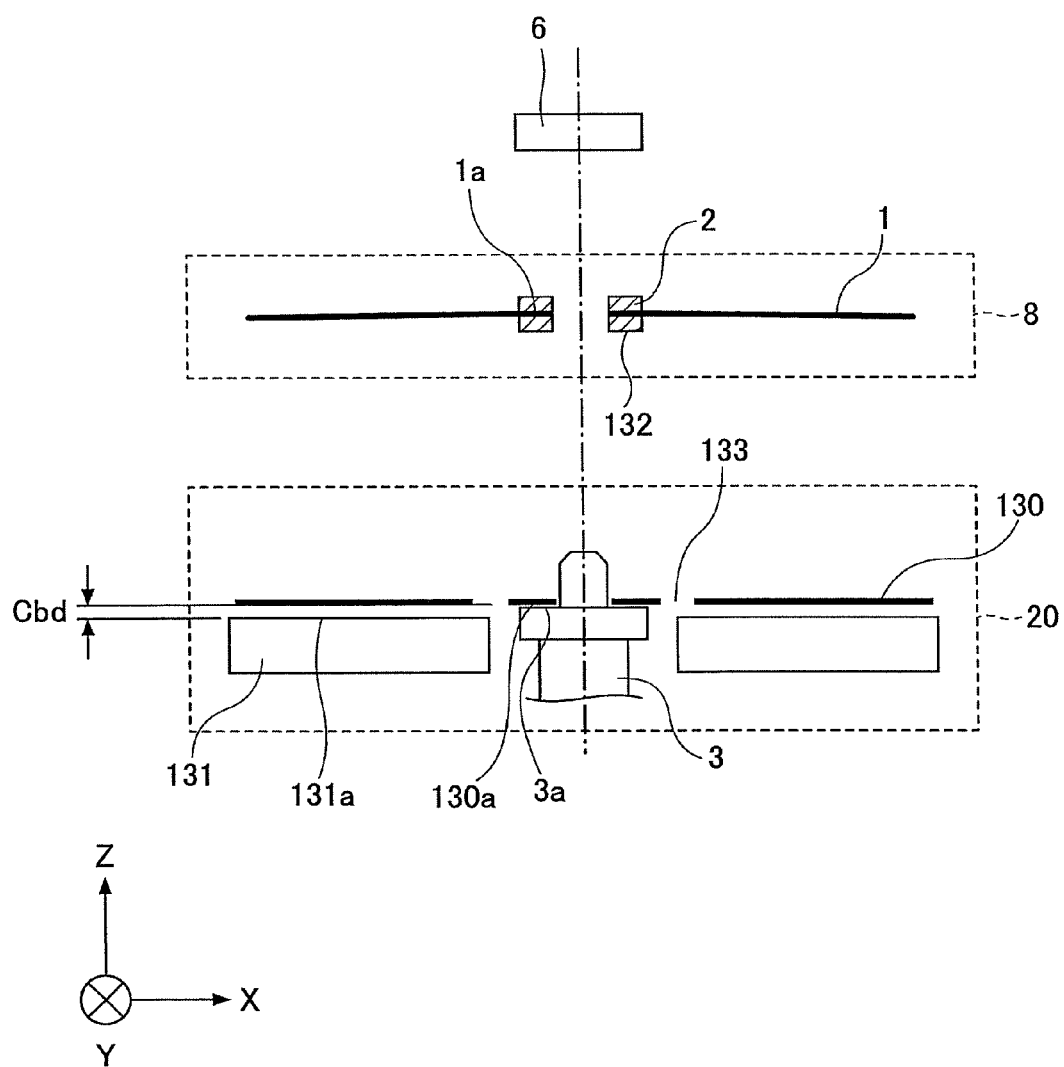
FIG. 27 is an exploded cross-sectional view of an example of the disk rotating device taken along the line C-C' indicated in FIG. 21.

FIG. 27 is an exploded cross-sectional view of an example of the disk rotating device in a recording and reproducing device of an embodiment of the invention. FIG. 27 shows the state of the disk rotating device immediately before the disk assembly is set in the recording and reproducing device of this embodiment.

In this embodiment, the second stabilizer 131 and the first stabilizer 130 are arranged in the drive device 20 side, and the disk assembly 8 in which the hub 2, the spacer 132, and the disk 1 are connected is loaded to the drive device 20 by the loading mechanism which is not illustrated.

In this embodiment, the parameter value Cbd of the gap between the first stabilizer 130 and the second stabilizer 131, which is the condition for stabilizing the air flow in the first stabilizer 130 and the second stabilizer 131, and the shape parameter of the openings 133, which is the condition for stabilizing the rotation of the disk 1 by the first stabilizer 130, are determined by the design of the drive device 20.

On the other hand, the shape parameter of the spacer 132 which is the condition for stabilizing the rotation of the disk 1 by the first stabilizer 130 is determined by the design of the disk assembly 8.

Figure 28:
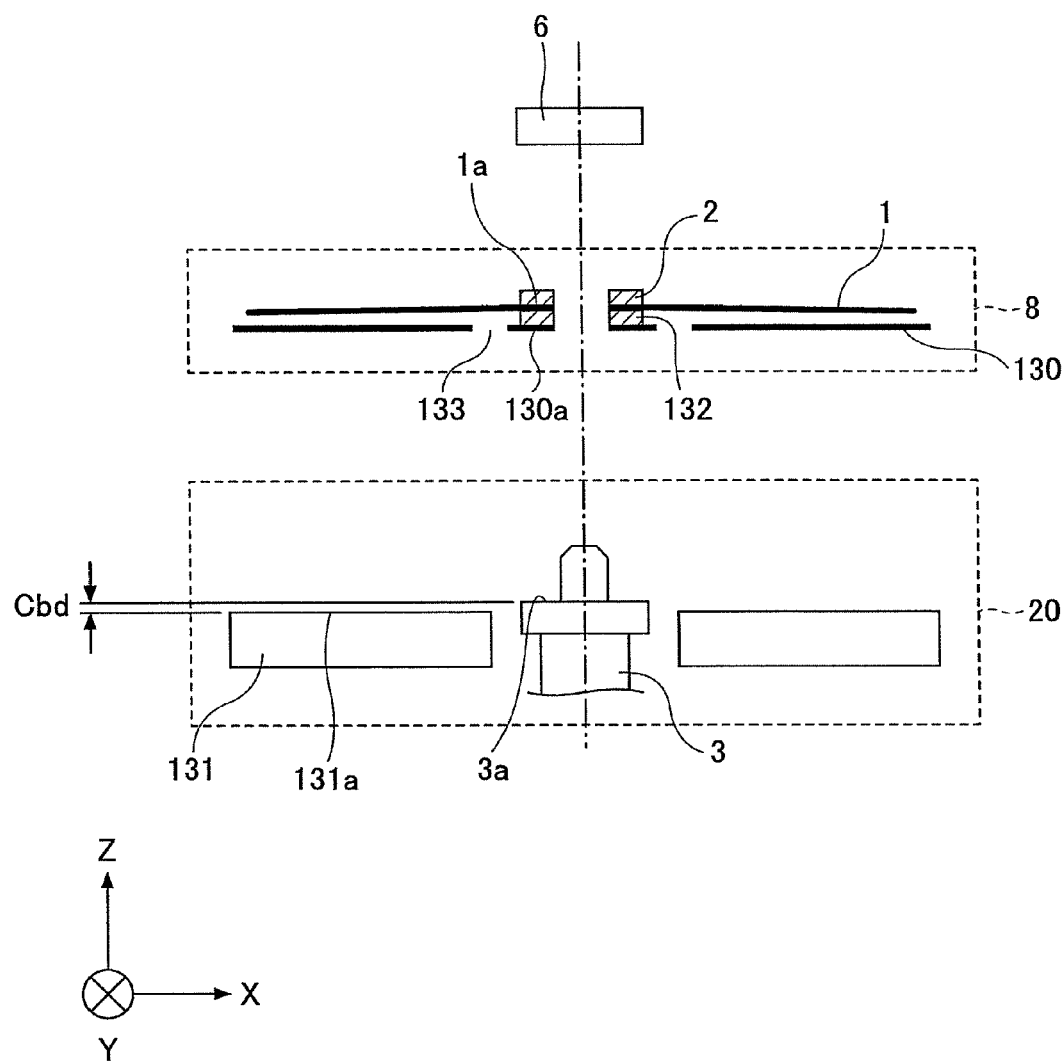
FIG. 28 is an exploded cross-sectional view of an example of the disk rotating device taken along the line C-C' indicated in FIG. 21.

FIG. 28 is an exploded cross-sectional view of an example of the disk rotating device in a recording and reproducing device of an embodiment of the invention. FIG. 28 shows the state of the disk rotating device immediately before the disk assembly is set in the recording and reproducing device of this embodiment.

In this embodiment, the second stabilizer 131 is arranged in the drive device 20 side, and the hub 2, the spacer 132, the disk 1, and the first stabilizer 130 are arranged in the disk assembly 8. The second stabilizer 131 is arranged to face the disk 1 across the first stabilizer 130.

The disk assembly 8 is loaded to the drive device 20 by using the loading mechanism which is not illustrated, so that the disk 1 in the disk assembly 8 is rotated by the disk rotating device.

In this embodiment, the parameter value Cbd of the gap between the second stabilizer 131 and the first stabilizer 130, which is the condition for stabilizing the air in the first stabilizer 130 and the second stabilizer 131, is determined by the design of the drive device 20. The shape parameter of the spacer 132 and the openings 133, which is the condition for stabilizing the rotation of the disk 1 by the first stabilizer 130, is determined by the design of the disk assembly 8.

Figure 29:
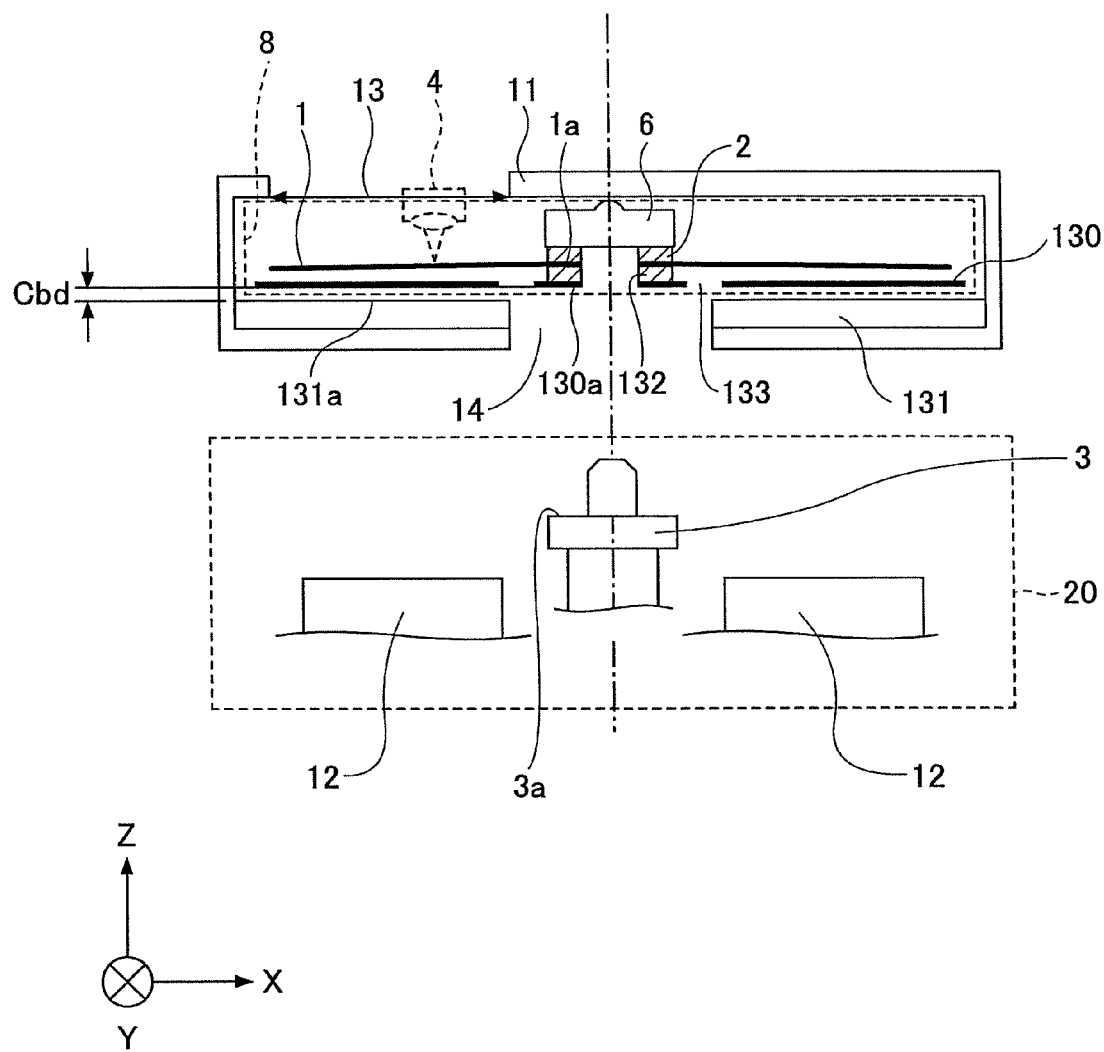
FIG. 29 is an exploded cross-sectional view of a disk system.
Figure 30:
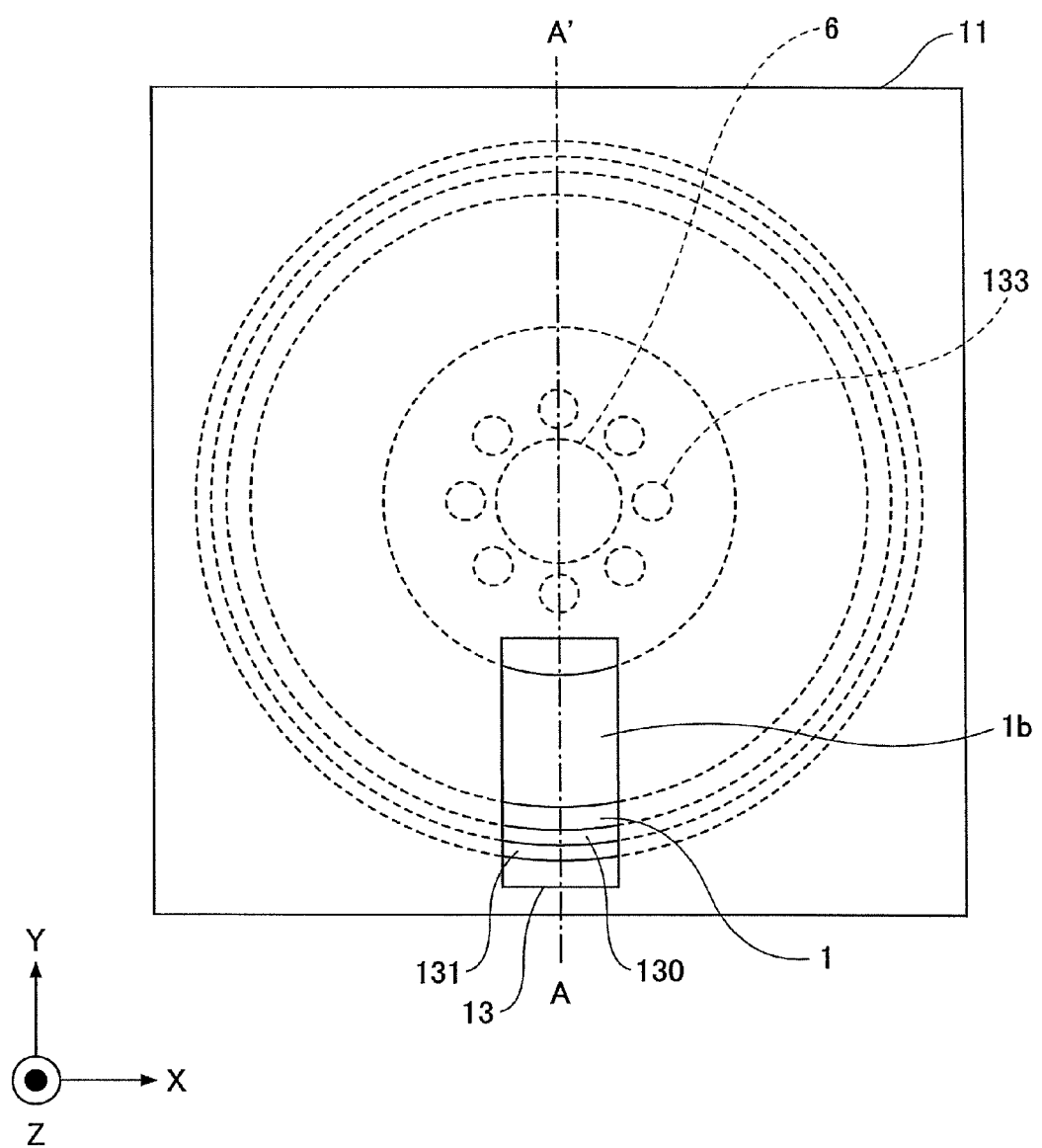
FIG. 30 is a plan view of a disk cartridge in the disk system of FIG. 29.

FIG. 29 is an exploded cross-sectional view of a disk rotating device in a recording and reproducing device of an embodiment of the invention. FIG. 30 is a plan view of a disk cartridge of an embodiment of the invention. FIG. 29 shows the state of the disk rotating device immediately before the disk cartridge is set in the recording and reproducing device.

Reference numeral 12 denotes a disk cartridge positioning mechanism which determines the Z axis position of the disk cartridge 11 for setting up the parameter value Cbd of the gap between the second stabilizer 131 and the first stabilizer 130, and determines the relative positions in the Z axis direction of the spindle 3 and the disk cartridge 11. In FIG. 30, the dotted lines indicate the configuration inside the disk cartridge.

As shown in FIG. 30, the information recording portion 1b of the disk 1 is the doughnut-shape portion except the inside and outside peripheral portions of the disk 1 near the center of the disk 1 as in the normal disk according to the related art.

Reference numeral 13 denotes a recording/reproducing head access opening for enabling the recording/reproducing head 4 (or the optical pickup) to access the disk 1. Reference numeral 14 denotes a spindle access opening for enabling the spindle 3 to connect with the disk assembly 8.

In this embodiment, the disk cartridge 11 which accommodates the disk assembly 8 in which the disk fixing cap 6, the hub 2, the spacer 132, the disk 1, and the first stabilizer 130 are connected, is loaded to the drive device 20 by using the loading mechanism (which is not illustrated). By using the disk cartridge positioning mechanism 12, the relative positions in the Z axis direction of the spindle 3 and the disk cartridge 11 are determined so that the disk 1 in the disk assembly 8 is rotated by the disk rotating device.

In this embodiment, the parameter value Cbd of the gap between the second stabilizer 131 and the first stabilizer 130, which is the condition for stabilizing the air in the first stabilizer 130 and the second stabilizer 131, is determined by the structural design of the disk cartridge 11 (the thicknesses of the second stabilizer 131 and the disk cartridge 11) and the structural design of the drive device 20 (the Z axis positions of the disk cartridge positioning mechanism 12 and the spindle 3). The shape parameter of the spacer 132 and the openings 133, which is the condition for stabilizing the rotation of the disk 1 by the first stabilizer 130, is determined by the design of the disk assembly 8.

In the state where the disk cartridge 11 is unloaded, the recording/reproducing head access opening 13 and the spindle access opening 14 are closed by the components which are not illustrated, so that the foreign matter, such as garbage, dust, etc. does not enter the disk cartridge at the time of storage.

Even when the first stabilizer 130 is connected with the disk 1 as in this embodiment, the information recording portion of the disk 1 is protected by the first stabilizer 130. The first stabilizer 130 can be easily removed from the disk assembly 8 or the disk cartridge, and can be exchanged with new one. For this reason, the disk assembly 8 or the disk cartridge can be easily repaired without damaging the disk 1 in which the recorded information is retained.

Next, with respect to the embodiments of FIG. 21-30, some examples of the recording and reproducing device, the disk assembly and the disk cartridge according to the invention (i.e., example-5, 6, 7, 8) will be described.

Example-5 will be described. In the example-5, the composition of the recording and reproducing device in the embodiment of FIG. 26 is used, the disk assembly 8 is loaded to the drive device 20, and the operations of rotating and stopping the disk 1 are repeated.

The second stabilizer is made of a stainless steel and formed into a plate with the outer diameter of 130 mm, the through hole with the inside diameter of 35 mm is formed in the center, and the spindle 3 is arranged as illustrated. In this case, the spindle 3 and the second stabilizer 131 are fixed to the drive device 20 so that the parameter value Cbd which is the gap in the Z axial position between the surface of the spindle 3 on which the first stabilizer is mounted and the operating surface of the second stabilizer 131 is set to 0.20 mm. The first stabilizer 130 and the spacer 132 are fixed to the rotating shaft of the spindle 3, and the drive device 20 is set up. The setting surface on the rotating shaft of the spindle 3 is formed to have the outer diameter of 29 mm.

The first stabilizer is formed of a polyethylene terephthalate film with the thickness of 125 micrometers, and formed to have the outer diameter of 128 mm and the center diameter of 15 mm, and the openings with the outer diameter of 5 mm are formed at eight equal intervals on the circumference of the diameter of 35 mm, and further the film of AgPdCu is deposited on the both sides of the first stabilizer by sputtering. The spacer 132 is formed of a stainless steel material with the thickness of 200 micrometers, and formed to have the outer diameter of 29 mm and the center diameter of 15 mm.

The disk assembly 8 in which the disk 1 and the hub 2 are connected is loaded to the drive device 20 by using the loading mechanism which is not illustrated, and the disk 1 is fixed by the disk fixing cap 6. Then, the disk 1 is rotated with the first stabilizer 130 by the spindle 3, and the rotating and stopping operations of the disk 1 are repeated. The evaluation result of the rotating and stopping operations of the disk 1 will be described later.

The disk assembly 8 is prepared in the following manner. A sheet of polycarbonate with the diameter of 120 mm and the thickness of 80 micrometers is used as the base material of the disk 1. First, the grooves with the pitch of 0.6 micrometers and the width of 0.3 micrometers (15 micrometers in thickness) are transferred from the stamper to this sheet by heat transfer. Then, the films are deposited on the sheet by sputtering in order of the films of $Si_3N_4$ 10 nm/ZnS—$SiO_2$ 25 nm/AgInSbTeGe 10 nm/($ZrO_2$—$Y_2O_3$)—$SiO_2$ 7 nm/Ag reflective layer 120 nm. The information recording portion of the disk is set in the range from the inside periphery diameter of 50 mm to the outside peripheral diameter of 116 mm (or the range of 25 mm-58 mm in radius).

Then, the spin coating of an UV resin is performed and the UV resin is cured by irradiation of ultraviolet rays so that the transparent protective film with the thickness of 10 micrometers is formed on the surface of the disk 1. The hard coat with the thickness of 10 micrometers is formed on the opposite surface of the disk 1. The hub 2 made of a stainless steel foil with the outer diameter of 29 mm, the inside diameter of 15 mm, and the thickness of 0.1 mm is attached to one side (opposite to the information recording layer forming side) of the central part of the thus produced disk 1 with an adhesive (0.03 mm in thickness). The assembly of the disk assembly 8 is performed after matching each component with the central axis of the disk.

Example-6 will be described. In the example-6, the composition of the recording and reproducing device in the embodiment of FIG. 27 is used, the disk assembly 8 is loaded to the drive device 20, and the operations of rotating and stopping the disk 1 are repeated.

The second stabilizer is made of a stainless steel material and formed into a plate with the outer diameter of 130 mm, a through hole with the inside diameter of 35 mm is formed in the center, and the spindle 3 is arranged as shown in FIG. 27. In this case, the spindle 3 and the second stabilizer 131 are fixed to the drive device 20 so that the parameter value Cbd of the gap in the Z axis position between the surface of the spindle 3 on which the first stabilizer is mounted and the operating surface of the second stabilizer 131 are set to 0.20 mm. The first stabilizer 130 is fixed to the rotating shaft of the spindle 3, and the drive device 20 is set up.

The setting surface on the rotating shaft of the spindle 3 is formed to have the outer diameter of 29 mm. The first stabilizer 130 is made of a stainless steel foil with a thickness of 30 micrometers and formed to have the outer diameter of 128 mm and the center diameter of 15 mm, and the openings 133 with the outer diameter of 5 mm are formed on the circumference of the diameter of 30 mm at eight equal intervals.

The disk assembly 8 in which the hub 2, the disk 1, and the spacer 132 are connected is loaded to the drive device 20 by using the loading mechanism which is not illustrated, and the disk 1 is fixed by the disk fixing cap 6. Then, the disk 1 is rotated with the first stabilizer 130 by the spindle 3, and the rotating and stopping operations of the disk 1 are repeated. The evaluation result and the rotating and stopping operations of the disk 1 will be described later.

The disk assembly 8 is prepared in the following manner. The disk 1 is prepared in the same manner as in the example-5, and the hub 2 made of a stainless steel foil with the outer diameter of 29 mm, the inside diameter of 15 mm, and the thickness of 0.1 mm is attached to one side (opposite to the information recording layer forming side) of the central part of the disk 1 with an adhesive (0.03 mm in thickness). The spacer 132 made of a stainless foil with the outer diameter of 29 mm, the inside diameter of 15 mm, and the thickness of 0.15 mm is attached to the opposite side of the disk (the information recording layer forming side) with an adhesive (0.05 mm in thickness). The assembly of the disk assembly 8 is performed after matching each component with the central axis of the disk.

Example-7 will be described. In the example-7, the composition of the recording and reproducing device in the embodiment of FIG. 28 is used, the disk assembly 8 is loaded to the drive device 20, and the operations of rotating and stopping the disk 1 are repeated.

Figure 25B:
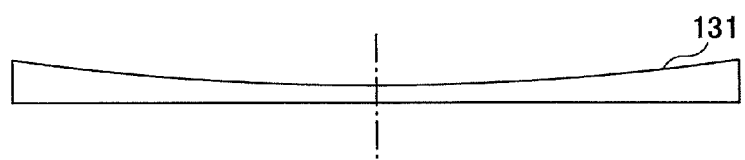

The second stabilizer is made of a stainless steel material and formed to have the curved concave surface as shown in FIG. 25B. Specifically, the second stabilizer is formed to have the outer diameter of 130 mm, the inside diameter of 35 mm, the flat part 131b with the width Wcf of 30 mm near the centerline, and the cylindrical curved concave surface 131c with the radius of curvature R of 1000 mm. The spindle 3 is arranged in the through hole of the second stabilizer 131 at the central part of the disk as shown in FIG. 28. In this case, the spindle 3 and the second stabilizer 131 are fixed to the drive device 20 so that the parameter value Cbd of the gap in the Z axial position between the surface of the spindle 3 on which the first stabilizer is mounted and the operating surface (the flat surface near the centerline 131d) of the second stabilizer 131 is set to 0.20 mm. The setting surface on the rotating shaft of the spindle 3 is formed to have the outer diameter of 29 mm.

The disk assembly 8 in which the hub 2, the disk 1, the spacer 132, and the first stabilizer 130 are connected is loaded to the drive device 20 by using the loading mechanism which is not illustrated, and the disk 1 is fixed by the disk fixing cap 6. Then, the disk 1 is rotated by the spindle 3 and the rotating and stopping operations are repeated. The evaluation result and the rotating and stopping operations of the disk 1 will be described later.

The disk assembly 8 is prepared in the following manner. The disk 1 is prepared in the same manner as the example-5, and the hub 2 made of a stainless steel foil with the outer diameter of 29 mm, the inside diameter of 15 mm, and the thickness of 0.1 mm is attached to one side of the central part of the disk (opposite to the information recording layer forming side) with an adhesive (0.03 mm in thickness). The spacer 132 made of a stainless steel foil with the outer diameter of 29 mm, the inside diameter of 15 mm, and the thickness of 0.10 mm is attached to the opposite side of the disk (the information recording layer forming side) with an adhesive (0.05 mm in thickness). The first stabilizer 130 is attached to the opposite surface of the spacer 132 with an adhesive (0.05 mm in thickness). The first stabilizer is made of a stainless steel foil with the thickness of 30 micrometers and formed to have the outer diameter of 128 mm and the center diameter of 15 mm, and the openings with the outer diameter of 5 mm are formed on the circumference of the diameter of 35 mm at eight equal intervals. The assembly of the disk assembly 8 is performed after matching each component with the central axis of the disk.

Example-8 will be described. In the example-8, the composition of the recording and reproducing device in the embodiment of FIG. 29 and FIG. 30 is used, the disk cartridge 11 in which the disk assembly 8 is accommodated is loaded to the drive device 20, and the operations of rotating and stopping the disk 1 are repeated. The evaluation result and the rotating and stopping operations of the disk 1 will be described later.

The disk cartridge 11 is formed with the second stabilizer 131 in the inner wall and arranged to accommodate the disk assembly 8, and the disk cartridge 11 is arranged so that the opening and closing of the spindle access opening 14 and the recording/reproducing head access opening 13 may be performed by the mechanism which is not illustrated.

The second stabilizer 131 is made of an acrylic resin and formed into a plate with the outer diameter of 130 mm, and the through hole (the opening which leads to the spindle access opening 14 of the disk cartridge 11) with the inside diameter of 35 mm is formed at the center. The AgPdCu film is deposited on the operating surface of the second stabilizer 131 by sputtering.

The disk assembly 8 is the same as the disk assembly of the example-7, and the disk fixing cap 6 is attached to the disk assembly 8 with an adhesive (0.03 mm in thickness). The drive device 20 is provided with the positioning mechanism 12 of the cartridge Z axis position, and the outer wall of the disk cartridge 11 is attached to the drive device 20.

The drive device 20 is arranged so that the difference Cbd between the surface on which the first stabilizer of the spindle 3 is mounted and the Z axial position of the operating surface of the second stabilizer 131 is set to 0.20 mm. The setting surface on the rotating shaft of the spindle 3 is formed to have the outer diameter of 29 mm.

The disk cartridge 11 which accommodates the disk assembly 8 in which the disk fixing cap 6, the hub 2, the disk 1, the spacer 132, and the first stabilizer 130 are connected is loaded to the drive device 20 by using the loading mechanism which is not illustrated, and the outer wall of the disk cartridge 11 is brought in contact with the positioning mechanism 12 of the cartridge Z axis position, and the disk assembly 8 is fixed to the rotating shaft of the spindle 3, and the rotating and stopping operations are repeated.

A comparative example having the composition in which the first stabilizer 130 and the spacer 132 are excluded from the embodiment of FIG. 22 will be described. In the comparative example, the disk assembly in which the disk 1 and the hub 2 are connected is the same as that of example-5. The spindle 3 and the stabilizer are fixed to the drive device so that the difference Cbd in the Z axial position between the disk setting surface of the spindle 3 and the operating surface of the stabilizer might be set to 0.20 mm.

The stabilizer made of a stainless steel material which is the same as that of the second stabilizer of example-5 is used. The setting surface on the rotating shaft of the spindle 3 and the outer diameter of the hub 2 are formed to have the outer diameter of 29 mm. In this state, the rotating and stopping operations of the disk 1 are repeated.

A description will be given of the rotating and stopping operations and the evaluation result.

The disk 1 is rotated at the rotational speed of 13000 rpm to conduct the preliminary test of the disk 1. In the examples-5 to 8 and the comparative example, the disk 1 is rotated normally.

However, when the disk 1 is rotated at the rotational speed of 14000 rpm, in the examples and the comparative example other than the example-7, the abnormal vibration is overlapped on the peripheral part of the disk 1, and it is difficult to stabilize the rotation of the disk 1 when the rotational speed exceeds 14000 rpm.

In the example-7, the disk 1 is rotated normally even when the rotational speed is about 15000 rpm. The evaluation test is not performed when the disk 1 is rotated at a high speed over 15000 rpm. In the example-7, it is considered that the use of the surface 131*a* of the second stabilizer formed into the special concave surface is effective in stabilizing the rotation of the disk 1.

With each of the above examples and the comparative example, the rotating operation to rotate the disk 1 at the rotational speed of 13000 rpm and the stopping operation to stop the rotation of the disk 1 are repeated.

The rotating and stopping operations are repeated such that a single cycle of the repeated operations includes a step of increasing the rotational speed to 13000 rpm in 5 seconds, a step of keeping the rotational speed of 13000 rpm for 5 seconds, a step of decreasing the rotational speed to 0 rpm in 5 seconds, and a step of stopping the rotation in 3 seconds.

The test result of the repeated rotating and stopping operations of the respective examples and the comparative example will be described.

In the example-5 and the example-8, after several hundred repetitions of the rotating and stopping operations, there is a case where it is impossible to rotate the disk 1 due to contacting or sliding of the first stabilizer 130 and the second stabilizer 131. This is because the metal film (AgPdCu film) formed in the first stabilizer or the second stabilizer is gradually separated by the sliding and worn out so that the resin on the base material is exposed to the surface.

Even in this situation, the disk 1 is certainly protected by the first stabilizer, and the serious problem that recording or reproducing of the disk 1 is impossible as in the comparative example does not arise. Maintenance and recovery can be easily performed by exchanging the defective component in which the resin of the first stabilizer or the second stabilizer is exposed.

In the example-6 and the example-7, the above problem does not arise and it is possible to perform the repeated rotating and stopping operations of the disk 1 at the high speed stably.

In the comparative example, after several tens of repetition operations, contacting or sliding of the disk 1 and the stabilizer takes place, and eventually it is impossible to rotate the disk 1 due to fixing of the disk 1 and the stabilizer. By the sliding, many scratches arise on the surface of the disk 1 on the side of the stabilizer, and the disk 1 itself may deform locally depending on the case.

As described in the foregoing, according to the embodiments of the invention, the disk rotating device is able to rotate a flexible disk at a high speed over 10000 rpm without accumulating the distortion in the inside peripheral portion of the disk, and does not develop surface vibration of the disk over an extended period of time.

The present invention is not limited to the specifically disclosed embodiments, and variations and modifications may be made without departing from the scope of the present invention.

The present application is based on Japanese patent application No. 2008-064752, filed on Mar. 13, 2008, and Japanese patent application No. 2008-066750, filed on Mar. 14, 2008, the contents of which are incorporated herein by reference in their entirety.

The invention claimed is:

1. A flexible disk in which optical information is recordable, the flexible disk comprising:
   an optical information recording portion where the optical information is stored;
   a holding part that is held on a turntable of a disk rotating device, the holding part having a front surface and a back surface, and wherein the holding part comprises a hub; and
   a first elastic body disposed on the front surface of the holding part, and a second elastic body disposed on the back surface of the holding part, such that the holding part is located between the first elastic body and the second elastic body, and
   wherein the first elastic body and the second elastic body are configured to elastically expand in a radial direction of the flexible disk, from an original state, when the optical information recording portion is rotated at high speed during recording and/or reading of the optical information, and wherein the first elastic body and the second elastic body are configured to reversibly return to the original state when rotation of the optical information recording portion is stopped.

2. The flexible disk according to claim 1, wherein each elastic body is made of a rubber or a cured adhesive, and has a modulus of shearing elasticity of about 10-100 MPa.

3. The flexible disk according to claim 1, wherein the radius of the hub is substantially equal to the radii of the elastic bodies.

4. The flexible disk according to claim 1, wherein the flexible disk is configured to be rotated at over 10,000 rpm, and wherein the thickness of each elastic body is about twice as large as the amount of elastic deformation at a peripheral edge of the holding part when the flexible disk is rotated at over 10,000 rpm.

* * * * *